(12) United States Patent
Takeuchi et al.

(10) Patent No.: US 9,620,769 B2
(45) Date of Patent: Apr. 11, 2017

(54) POWER STORAGE DEVICE, ELECTRODE THEREOF, AND METHOD FOR MANUFACTURING POWER STORAGE DEVICE

(75) Inventors: Toshihiko Takeuchi, Kanagawa (JP); Teppei Oguni, Kanagawa (JP); Takeshi Osada, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 665 days.

(21) Appl. No.: 13/491,647

(22) Filed: Jun. 8, 2012

(65) Prior Publication Data

US 2012/0328962 A1  Dec. 27, 2012

(30) Foreign Application Priority Data

Jun. 24, 2011 (JP) ................................. 2011-140253
Jun. 24, 2011 (JP) ................................. 2011-140429

(51) Int. Cl.
*H01M 4/64* (2006.01)
*H01M 4/66* (2006.01)
(Continued)

(52) U.S. Cl.
CPC ......... *H01M 4/134* (2013.01); *H01M 4/0428* (2013.01); *H01M 4/1395* (2013.01);
(Continued)

(58) Field of Classification Search
None
See application file for complete search history.

(56) References Cited

U.S. PATENT DOCUMENTS 3,796,598 A  3/1974  Gejyo et al.
4,155,781 A  5/1979  Diepers
(Continued)

FOREIGN PATENT DOCUMENTS

CN  001516299 A  7/2004
CN  101361209 A  2/2009
(Continued)

OTHER PUBLICATIONS

Jung.H et al., "Amorphous silicon thin-film negative electrode prepared by low pressure chemical vapor deposition for lithium-ion batteries", Solid State Communications, Feb. 1, 2003, vol. 125, No. 7-8, pp. 387-390.
(Continued)

*Primary Examiner* — Patrick Ryan
*Assistant Examiner* — Christopher Domone
(74) *Attorney, Agent, or Firm* — Nixon Peabody LLP; Jeffrey L. Costellia

(57) ABSTRACT

To provide a power storage device having excellent charge/discharge cycle characteristics and a high charge/discharge capacity. The following electrode is used as an electrode of a power storage device: an electrode including a current collector and an active material layer provided over the current collector. The active material layer includes a plurality of whisker-like active material bodies. Each of the plurality of whisker-like active material bodies includes at least a core and an outer shell provided to cover the core. The outer shell is amorphous, and a portion between the current collector and the core of the active material bodies is amorphous. Note that a metal layer may be provided instead of the current collector, the active material bodies do not necessarily have to include the core, and a mixed layer may be provided between the current collector and the active material layer.

21 Claims, 16 Drawing Sheets

(51) Int. Cl.
  *H01M 4/04*     (2006.01)
  *H01M 8/22*     (2006.01)
  *H01M 4/134*    (2010.01)
  *H01M 4/1395*   (2010.01)

(52) U.S. Cl.
  CPC ........... *H01M 4/661* (2013.01); *H01M 4/667* (2013.01); *Y02P 70/54* (2015.11)

(56) References Cited

U.S. PATENT DOCUMENTS

| | | |
|---|---|---|
| 4,764,853 A | 8/1988 | Thomas et al. |
| 5,338,625 A | 8/1994 | Bates et al. |
| 6,134,902 A | 10/2000 | Curry |
| 6,379,846 B1 * | 4/2002 | Terahara et al. ............ 429/344 |
| 6,451,113 B1 | 9/2002 | Givargizov |
| 6,685,804 B1 | 2/2004 | Ikeda et al. |
| 6,844,113 B2 | 1/2005 | Yagi et al. |
| 6,887,511 B1 | 5/2005 | Shima et al. |
| 7,015,496 B2 | 3/2006 | Ohnuma et al. |
| 7,192,673 B1 | 3/2007 | Ikeda et al. |
| 7,235,330 B1 | 6/2007 | Fujimoto et al. |
| 7,241,533 B1 | 7/2007 | Ikeda et al. |
| 7,311,999 B2 | 12/2007 | Kawase et al. |
| 7,396,409 B2 | 7/2008 | Hatta et al. |
| 7,410,728 B1 | 8/2008 | Fujimoto et al. |
| 7,781,101 B2 | 8/2010 | Okazaki et al. |
| 7,794,881 B1 | 9/2010 | Fujimoto et al. |
| 8,257,866 B2 | 9/2012 | Loveness et al. |
| 8,268,484 B2 | 9/2012 | Okazaki et al. |
| 8,450,012 B2 | 5/2013 | Cui et al. |
| 8,556,996 B2 | 10/2013 | Loveness et al. |
| 8,715,855 B2 | 5/2014 | Kawakami et al. |
| 9,172,088 B2 | 10/2015 | Loveness et al. |
| 9,172,094 B2 | 10/2015 | Loveness et al. |
| 2002/0168574 A1 | 11/2002 | Ahn et al. |
| 2005/0244324 A1 | 11/2005 | Hatta et al. |
| 2007/0007239 A1 | 1/2007 | Lee et al. |
| 2007/0295718 A1 | 12/2007 | Takei et al. |
| 2008/0020281 A1 | 1/2008 | Kogetsu et al. |
| 2008/0261112 A1 | 10/2008 | Nagata et al. |
| 2009/0045680 A1 | 2/2009 | Litch et al. |
| 2009/0117462 A1 | 5/2009 | Okazaki et al. |
| 2009/0136847 A1 | 5/2009 | Jeong et al. |
| 2009/0162750 A1 * | 6/2009 | Kawakami et al. ....... 429/218.1 |
| 2009/0197209 A1 | 8/2009 | Penner et al. |
| 2009/0317726 A1 | 12/2009 | Hirose et al. |
| 2010/0086837 A1 | 4/2010 | Asari et al. |
| 2010/0092856 A1 | 4/2010 | Hirose et al. |
| 2010/0151322 A1 | 6/2010 | Sato et al. |
| 2010/0178564 A1 | 7/2010 | Asari et al. |
| 2010/0209784 A1 | 8/2010 | Yamazaki et al. |
| 2010/0266898 A1 | 10/2010 | Yamamoto et al. |
| 2010/0285358 A1 | 11/2010 | Cui et al. |
| 2010/0330419 A1 | 12/2010 | Cui et al. |
| 2010/0330421 A1 | 12/2010 | Cui et al. |
| 2011/0151290 A1 * | 6/2011 | Cui et al. ................. 429/50 |
| 2011/0229761 A1 | 9/2011 | Cui et al. |
| 2011/0266654 A1 | 11/2011 | Kuriki et al. |
| 2011/0287318 A1 * | 11/2011 | Loveness ............ H01M 4/0428 429/218.1 |
| 2011/0289767 A1 | 12/2011 | Yamazaki |
| 2011/0292564 A1 | 12/2011 | Yamazaki |
| 2011/0294005 A1 | 12/2011 | Kuriki et al. |
| 2011/0294011 A1 | 12/2011 | Kuriki et al. |
| 2011/0300445 A1 | 12/2011 | Murakami et al. |
| 2011/0305950 A1 | 12/2011 | Kuriki et al. |
| 2012/0003383 A1 | 1/2012 | Furuno |
| 2012/0003530 A1 | 1/2012 | Kuriki et al. |
| 2012/0003807 A1 | 1/2012 | Furuno et al. |
| 2012/0015247 A1 | 1/2012 | Yoshida |
| 2012/0070738 A1 | 3/2012 | Yoshida |
| 2012/0070741 A1 | 3/2012 | Liu et al. |
| 2012/0183856 A1 | 7/2012 | Cui et al. |
| 2013/0320582 A1 | 12/2013 | Cui et al. |

FOREIGN PATENT DOCUMENTS

| | | |
|---|---|---|
| CN | 101849306 A | 9/2010 |
| CN | 101872861 A | 10/2010 |
| EP | 1986253 A | 10/2008 |
| EP | 2204867 A | 7/2010 |
| JP | 2001-210315 | 8/2001 |
| JP | 2003-246700 | 9/2003 |
| JP | 2004-281317 | 10/2004 |
| JP | 2004-288564 A | 10/2004 |
| JP | 2008-103118 A | 5/2008 |
| JP | 2009-134917 A | 6/2009 |
| JP | 2010-262752 A | 11/2010 |
| JP | 2012-526364 | 10/2012 |
| WO | WO-2010/129910 | 11/2010 |
| WO | WO-2010/138617 | 12/2010 |
| WO | WO-2010/138619 | 12/2010 |
| WO | WO-2011/109477 | 9/2011 |
| WO | WO-2011/119614 | 9/2011 |
| WO | WO-2011/149958 | 12/2011 |
| WO | WO-2012/054767 | 4/2012 |

OTHER PUBLICATIONS

Chan et al., "High-Performance Lithium Battery Anodes Using Silicon Nanowires", Nature Nanotechnology, vol. 3, Jan. 1, 2008, pp. 31-35.

Miyamoto et al., "Polytypism and Amorphousness in Silicon Whiskers", vol. 44, No. 1, Journal of the Physical Society of Japan, Jan. 1, 1978, pp. 181-190.

Cui et al., "Crystalline-Amorphous Core-Shell Silicon Nanowires for High Capacity and High Current Battery Electrodes", Nano Letters, vol. 9, No. 1, Jan. 1, 2009, pp. 491-495.

Kamins et al., "Ti-Catalyzed Si Nanowires by Chemical Vapor Deposition: Microscopy and Growth Mechanisms", Journal of Applied Physics, vol. 89, No. 2, Jan. 15, 2001, pp. 1008-1016.

Kohno et al., "Silicon Nanoneedles Grow by a Simple Thermal Treatment Using Metal-Sulfur Catalysts", Japanese Journal of Applied Physics, vol. 41, No. 2A, Feb. 1, 2002, pp. 577-578.

Chinese Office Action (Application No. 201210213019 X) Dated Jun. 24, 2015.

Taiwanese Office Action (Application No. 101122206) Dated Jan. 25, 2016.

* cited by examiner

POWER STORAGE DEVICE, ELECTRODE THEREOF, AND METHOD FOR MANUFACTURING POWER STORAGE DEVICE

BACKGROUND OF THE INVENTION

1. Field of the Invention

The present invention relates to a power storage device and an electrode thereof.

Note that, in this specification, the power storage device refers to every element and every device which have a function of storing power.

2. Description of the Related Art

In recent years, power storage devices such as lithium-ion secondary batteries, lithium-ion capacitors, and air cells have been actively developed. Further, it has been proposed that such power storage devices be used in a variety of electric appliances such as a refrigerator (see Patent Document 1), an air conditioner (see Patent Document 2), an indoor lighting device (see Patent Document 3), and a microwave oven (see Patent Document 4).

An electrode for the power storage device is manufactured by forming an active material over a surface of a current collector, for example. As an active material which occludes lithium, a material which can occlude and release ions serving as carriers, such as carbon or silicon, is used. In particular, silicon has attracted attention because it has a higher theoretical capacity than carbon and is advantageous in increasing the capacities of power storage devices.

For example, Non-Patent Document 1 discloses a lithium-ion secondary battery whose positive electrode is formed using whisker-like single crystal silicon. Non-Patent Document 1 suggests that when whisker-like single crystal silicon is used, the structure of the electrode is not easily damaged even when the volume of silicon is changed due to occlusion and release of lithium ions, resulting in increases in charge/discharge characteristics.

REFERENCE

[Patent Document 1] United States Patent Application Publication No. 2009/0045680
[Patent Document 2] U.S. Pat. No. 6,134,902
[Patent Document 3] U.S. Pat. No. 4,764,853
[Patent Document 4] United States Patent Application Publication No. 2007/0295718
[Non-Patent Document] CANDACE K. CHAN et al., "High-performance lithium battery anodes using silicon nanowires". *Nature Nanotechnology*, Nature Publishing Group, Dec. 16, 2007, Vol. 3, pp. 31-35

SUMMARY OF THE INVENTION

An object of one embodiment of the present invention is to improve the adhesion between an active material and a surface on which the active material is formed, in the case where a whisker-like active material is used as the active material.

Another object of one embodiment of the present invention is to provide a power storage device having excellent charge/discharge cycle characteristics.

Another object of one embodiment of the present invention is to provide a power storage device having a high charge/discharge capacity.

In an electrode according to one embodiment of the present invention, a whisker-like material where at least an outer shell is amorphous (e.g., amorphous silicon) is used as an active material of a power storage device. A core of the whisker-like material may be crystalline (e.g., crystalline silicon). Note that only a part of the active material may have a whisker-like shape. Further, the active material may partly contain a crystal.

In the above structure, the whisker-like active material may partly be crystalline. It is preferable that 90% or more of the whisker-like active material be amorphous.

When a whisker-like material is used as an active material of a power storage device, it is necessary to improve the adhesion between the whisker-like material and a surface on which the whisker-like material is formed in order to prevent separation of the active material. This is for the purpose of repeatedly performing charging.

One embodiment of the present invention is a power storage device including a current collector or a metal layer, a mixed layer which is formed over the current collector or the metal layer through reaction of an active material and a metal element in the current collector or the metal layer, and a layer which is over the mixed layer and contains a whisker-like active material. The mixed layer has a thickness of 50 nm or less. Note that it is preferable that the mixed layer be not crystalline.

Although according to an example of welding, the adhesion is presumed to be improved as the thickness of the mixed layer is increased, the mixed layer is as thin as 50 nm or less. However, as is to be described in the following examples, when a mixed layer (e.g., a silicide layer) has a smaller thickness which is 50 nm or less, the adhesion of an active material is higher and the charge/discharge cycle characteristics of a power storage device, is more excellent. Note that although the thickness of the mixed layer is preferably 50 nm or less, the technical scope of one embodiment of the present invention covers the case where the thickness of the mixed layer is 100 nm or less.

One embodiment of the present invention is an electrode of a power storage device. The electrode includes a current collector and an active material layer provided over the current collector. The active material layer includes a plurality of whisker-like active material bodies. Each of the plurality of whisker-like active material bodies include at least a core and an outer shell provided to cover the core. The outer shell is amorphous, and a portion between the current collector and the core of each of the active material bodies is amorphous.

In the above structure, the active material may partly be crystalline. Further, it is preferable that 90% or more of the active material be amorphous.

In the above structure, an example of a material of the active material layer is silicon.

In the above structure, the length of the active material body in the longitudinal direction is preferably greater than or equal to 0.5 μm and less than or equal to 1000 μm.

In the above structure, the width of a cross section of the core of the active material body is preferably greater than or equal to 50 nm and less than or equal to 10000 nm.

In the above structure, an example of a material of the current collector or the metal layer is titanium.

One embodiment of the present invention is a method for manufacturing a power storage device. The method includes a step of forming an active material layer at least a part of which has a whisker-like shape over a current collector or a metal layer by a low-pressure chemical vapor deposition (LPCVD) method using a heated deposition gas.

In the electrode of a power storage device, according to one embodiment of the present invention, the adhesion between the current collector and the active material layer is high. Thus, the structure of the electrode is not easily damaged even when the volume of the active material layer is changed due to occlusion and release of ions serving as carriers, resulting in increases in charge/discharge cycle characteristics.

In the electrode of a power storage device, according to one embodiment of the present invention, the plurality of whisker-like active material bodies are provided and the core of the active material bodies is formed of, for example, crystalline silicon, so that the conductivity of the electrode is high. Accordingly, the charge/discharge capacity of the power storage device can be high.

DETAILED DESCRIPTION OF THE INVENTION

Figure 1A:
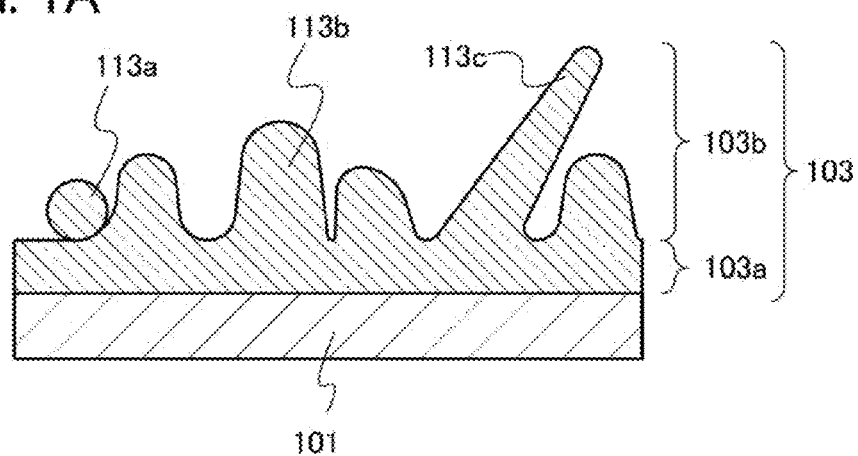
FIGS. 1A to 1C are cross-sectional views each illustrating a surface of an electrode of a power storage device according to one embodiment of the present invention.

An embodiment and examples of the present invention will be described below with reference to the drawings. Note, that the present invention is not limited to the following description, and it will be easily understood by those skilled in the art that various changes and modifications can be made without departing from the spirit and scope of the present invention. Thus, the present invention should not be interpreted as being limited to the following descriptions of the embodiment and the examples. In description using the drawings for reference, in some cases, the same reference numerals are used for common portions in different drawings. Further, in some cases, the same hatching patterns are applied to similar parts, and the similar parts are not necessarily designated by reference numerals.

In this embodiment, an electrode according to one embodiment of the present invention and a manufacturing method of the electrode will be described with reference to drawings.

Figure 2:
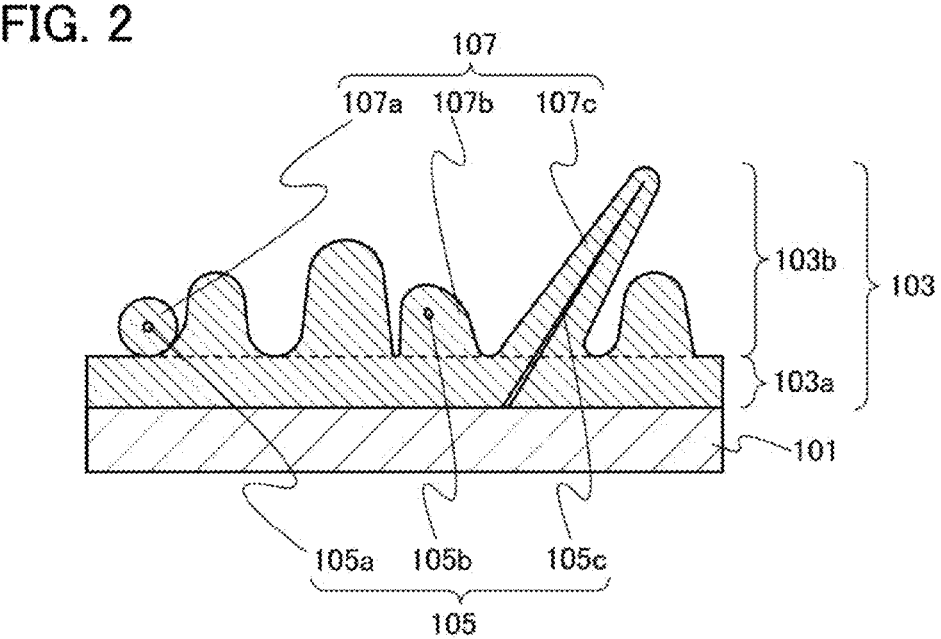
FIG. 2 is a cross-sectional view illustrating a surface of an electrode of a power storage device according to one embodiment of the present invention.

FIG. 2 is a schematic view illustrating a cross section of part of a surface of an electrode according to one embodiment of the present invention. The electrode in FIG. 2 includes a current collector 101 and an active material layer 103 provided over the current collector 101.

The active material layer 103 includes a region 103a in contact with the current collector 101 and a region 103b. The region 103b is provided over the region 103a and includes a plurality of whisker-like active material bodies. The plurality of whisker-like active material bodies provided in the region 103b includes cores 105 and outer shells 107.

Note that a core 105a, a core 105b, and a core 105c are collectively referred to as the cores 105. Further, an outer shell 107a, an outer shell 107b, and an outer shell 107c are collectively referred to as the outer shells 107.

The interface between the region 103a and the region 103b is vague and thus, the following surface is defined as the interface between the region 103a and the region 103b: a surface which is parallel to a surface of the current collector 101 and overlaps with the bottom of the deepest valley of valleys each formed between the adjacent whisker-like active material bodies of the plurality of whisker-like active material bodies included in the region 103b.

The current collector 101 functions as a current collector of an electrode and is formed using a conductive material having a foil shape, a plate shape, or a net shape.

For the current collector 101, any material can be used as long as it has conductivity, and a metal element with high conductivity, such as platinum, aluminum, copper, or titanium, is preferably used. Note that as a material of the current collector 101, an aluminum alloy to which an element which improves heat resistance, such as silicon, titanium, neodymium, scandium, or molybdenum, is added may be used.

Alternatively, in the case where the active material layer 103 is formed using silicon, a metal element that forms silicide by reacting with silicon may be used as a material of the current collector 101. As the metal element which reacts with silicon to form a silicide, zirconium, titanium, hafnium, vanadium, niobium, tantalum, chromium, molybdenum, tungsten, cobalt, nickel, and the like can be given.

In the case where a thin mixed layer is provided on the surface of the current collector 101, at least the surface of the current collector 101 contains the metal element that forms a silicide by reacting with silicon so that silicide is formed for the mixed layer.

Note that when the active material layer 103 is formed using silicon, an impurity element which imparts one conductivity type, such as phosphorus or boron may be added to the active material layer 103. Addition of an impurity element which imparts one conductivity type, such as phosphorus or boron, to silicon increases the conductivity of the silicon, leading to an increase in conductivity of the whole electrode.

The region 103a of the active material layer 103 is provided to cover the current collector 101. The region 103a is partly amorphous but may include a crystalline structure. Alternatively, the region 103a may include a material of the current collector 101.

Since the region 103a is partly amorphous, the adhesion between the current collector 101 and the region 103a is high as compared to the case where the region 103a is formed of only a crystal structure. This is because the active material layer 103 having an amorphous structure is more adaptable to the surface of the current collector 101, on which the active material layer 103 is formed. In other words, the active material layer 103 having an amorphous structure is more likely to be formed so as to be compatible with the surface of the current collector 101. Therefore, separation due to charging/discharging can be prevented, which makes it possible to provide a power storage device having improved charge/discharge cycle characteristics.

The plurality of whisker-like active material bodies included in the region 103b of the active material layer 103 is provided so as to be dispersed randomly.

The width of each of the cores 105 of the plurality of whisker-like active material bodies in the region 103b may be greater than or equal to 10 nm and less than or equal to 1000 nm, preferably less than or equal to 500 nm.

The length of each of the cores 105 is hot particularly limited but may be greater than or equal to 0.5 µm and less than or equal to 1000 µm, preferably greater than or equal to 2.5 µm and less than or equal to 100 µm.

The width of a cross section of each of the plurality of whisker-like active material bodies in the region 103b is greater than or equal to 50 nm and less than or equal to 10000 nm, preferably greater than or equal to 500 nm and less than or equal to 3000 nm. The length of each of the whisker-like active material bodies is greater than or equal to 0.5 µm and less than or equal to 1000 µm, preferably greater than or equal to 2.5 µm and less than or equal to 100 µm.

Note that the "length" of the core 105/the outer shell 107 refers to the distance between the top of the core 105/the outer shell 107 and the region 103a, in the direction along an axis passing through the top (or the center of the top surface) of the whisker-like active material body.

The plurality of whisker-like active material bodies in the region 103b may each have a columnar (cylindrical or prismatic) shape or a conical or pyramidal shape (which may also be referred to as needle-like shape). The top portion of the active material body may be curved.

The longitudinal directions of the plurality of whisker-like active material bodies in the region 103b do not necessarily have to be the same. When the longitudinal directions of the whisker-like active material bodies are different from each other, in FIG. 2, a transverse cross-sectional shape of the active material body (the cross-sectional shape of a portion including the core 105a and the outer shell 107a) is shown as well as a longitudinal cross-sectional shape of the active material body (the cross-sectional shape of a portion including the core 105c and the outer shell 107c). In a transverse cross section of the active material body, the core 105 is observed (is not observed) in the whisker-like active material body in some cases depending on a position. Further, the transverse cross section of the active material body is circular when the whisker-like active material body has a cylindrical or conical shape, and is polygonal when the whisker-like active material body has a prismatic or pyramidal shape. It is preferable that the longitudinal directions of the whisker-like active material bodies be not the same because one of the whisker-like active material bodies is likely to be entangled with the other, so that detachment (or separation) of the whisker-like active material bodies does not easily occur in charging/discharging.

Note that the direction in which the whisker-like active material body is extended from the region 103a is called the longitudinal direction, and the cross-sectional shape of the whisker-like active material body cut along the longitudinal direction is called a longitudinal cross-sectional shape. In addition, a cross-sectional shape of the whisker-like active material body cut along a surface perpendicular to or substantially perpendicular to the longitudinal direction of the whisker-like active material body is called a transverse cross sectional shape.

The outer shell 107 in the region 103b is partly or wholly amorphous. Thus, in the case where the whisker-like active material body including the outer shell 107 is used for an electrode of a power storage device, the volume of the electrode is less likely to be changed with occlusion and emission of ions serving as carriers and the electrode is less likely to be destroyed than in the case where the whisker-like active material body having only a crystalline structure is used.

Figure 1B:
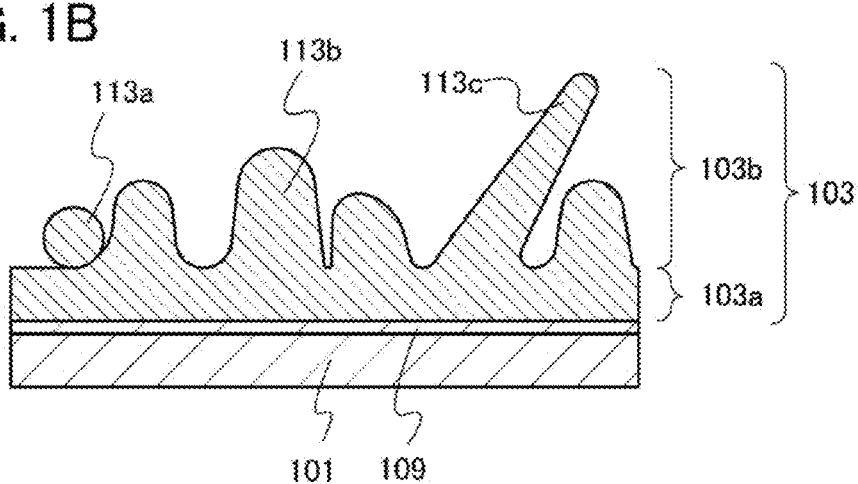
Figure 1C:
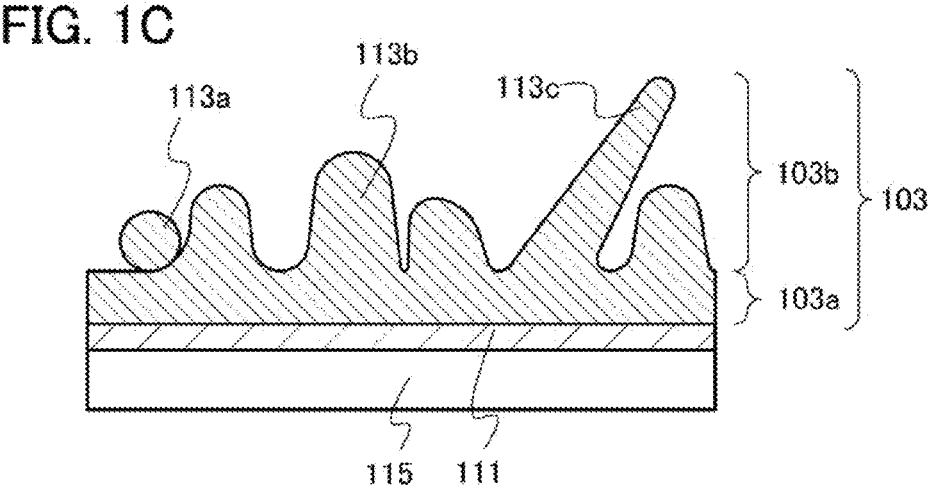

FIGS. 1A to 1C each illustrate an embodiment of the present invention in which a mixed layer is formed.

The mixed layer 109 is formed due to diffusion of part of the active material layer 103 into the current collector 101 when the active material layer 103 is formed by a method in which heating is performed at a predetermined temperature or higher (e.g., LPCVD method). Accordingly, as the heating temperature is higher, the mixed layer 109 is thicker. Note that the thickness of the mixed layer 109 docs not depend on only the formation temperature. In comparing the case where a material of the active material layer 103 is silicon and a material of the current collector 101 is titanium and the case where a material of the current collector 101 is nickel, on the assumption that the heating temperature is the same, the mixed layer 109 is formed thicker in the case where a material of the current collector 101 is nickel. This is because nickel forms silicide at a lower temperature than titanium.

In terms of the adhesion between the current collector 101 and the active material layer 103, the mixed layer 109 is preferably thin; thus, the heating temperature in the formation of the mixed layer 109 is preferably low. However, a temperature higher than or equal to a predetermined temperature is needed to form the whisker-like active material bodies.

Note that the boundary between the current collector 101 and the mixed layer 109 and the boundary between the mixed layer 109 and the active material layer 103 are not observed clearly in some cases even with a scanning transmission electron microscope (STEM) or the like.

Note that in one embodiment of the present invention, the active material layer does not necessarily have to include a core. FIGS. 1A to 1C illustrate embodiments of the present invention which are different from the embodiment in FIG. 2. FIG. 1A illustrates an embodiment in which a mixed layer is too thin to be observed. FIG. 1B illustrates an embodiment in which the mixed layer 109 is provided over the current collector 101. FIG. 1C illustrates an embodiment in which a metal layer 111 is provided over a substrate 115.

In FIG. 1A, the active material layer 103 includes the region 103a in contact with the current collector 101 and the region 103b. The region 103b is provided over the region 103a and includes a plurality of whisker-like active material bodies. The region 103a is formed of, for example, amorphous silicon, and the region 103b is formed of, for example, a whisker-like amorphous silicon layer.

Also in FIGS. 1A to 1C, the interface between the region 103a and the region 103b is not clear. Thus, the following surface is defined as the interface between the region 103a and the region 103b: a surface which is parallel to a surface of the current collector 101 and overlaps with the bottom of the deepest valley of valleys each formed between the adjacent whisker-like active material bodies of the plurality of whisker-like active material bodies included in the region 103b.

In FIGS. 1A to 1C, the region 103a is extremely thin or does not exist in some cases.

The region 103b includes a plurality of whisker-like active material bodies 113a, 113b, and 113c.

In each of the region 103a and the region 103b, 90% or more thereof in volume is preferably amorphous but a crystal may be included in a portion thereof.

The region 103a covers a large part of a surface of the current collector 101. In FIGS. 1A to 1C, the whisker-like active material bodies 113a, 113b, and 113c are illustrated; however, the shape thereof is not limited to a whisker-like shape and may be a cylindrical shape, a conical shape, or a needle-like shape. Whisker portions of the whisker-like active material bodies 113a, 113b, and 113c may be curved. The width of the whisker portion is greater than or equal to 0.05 μm and less than or equal to 10 μm, preferably greater than or equal to 0.5 μm and less than or equal to 3 μm. The length h of the whisker portion in the axis direction is greater than or equal to 0.5 μm and less than or equal to 1000 μm, preferably greater than or equal to 2.5 μm and less than or equal to 100 μm.

The length h of the whisker portion in the axis direction is the distance between the top of the whisker portion and the region 103a on an axis passing through the top or the center of the top surface of the whisker portion. The thickness of the active material layer 103 is the sum of the thickness of the region 103a and the length (i.e., the height) of the normal from the top of the whisker portion of the region 103b to the region 103a.

Note that the direction in which the whisker portion extends from the region 103a is referred to as the longitudinal direction. The cross section along the longitudinal direction is referred to as a longitudinal cross section. In addition, a plane in which the longitudinal direction is the normal direction is referred to as a transverse cross section. For example, in FIGS. 1A to 1C, a transverse cross section of the whisker-like active material body 113a and a longitudinal cross section of the whisker-like active material body 113c are shown.

The electrode of the power storage device, according to this embodiment, includes, in contact with the active material layer, a plurality of whisker-like active material bodies each of which has a width of greater than or equal to 0.05 μm and less than or equal to 10 μm, preferably greater than or equal to 0.5 μm and less than or equal to 3 μm, and a length h in the axis direction of greater than or equal to 0.5 μm and less than or equal to 1000 μm, preferably greater than or equal to 2.5 μm and less than or equal to 100 μm. Therefore, the surface area of the active material layer can be increased, so that the charge and discharge capacities can be increased.

Note that it is preferable that the longitudinal directions of the whisker-like active material bodies be not the same. This is because the whisker-like active material bodies are likely to be entangled with each other, so that detachment of the whisker-like active material bodies does not easily occur even when the power storage device is charged/discharged.

Here, when the thickness of the mixed layer 109 between the current collector 101 and the active material layer 103 is less than or equal to 100 nm, preferably less than or equal to 50 nm, adhesion can be improved. Therefore, even when charge/discharge cycles are repeated, the charge/discharge capacity can be maintained, resulting in enhancement of the charge/discharge cycle characteristics.

Although FIGS. 1A and 1B illustrate the embodiments in each of which the current collector 101 is formed using a conductive material having a foil shape, a plate shape, or a net shape, one embodiment of the present invention is not limited thereto. As illustrated in FIG. 1C, the substrate 115 over which the metal layer 111 is provided may be used. The metal layer 111 may be formed by a sputtering method, an evaporation method, a printing method, an inkjet method, a CVD method, or the like, and the active material layer 103 may be provided over the metal layer 111. A material of the metal layer 111 is preferably selected from the aforementioned materials that form silicide.

Although there is no particular limitation on a material or the like of the substrate 115, the substrate 115 preferably has flexibility. Note that the metal layer 111 can also function as a current collector.

When the active material layer 103 is formed in a chamber formed of quartz by a method in which heating is performed, such as an LPCVD method, oxygen detached from the wall of the chamber might enter the active material layer 103 and the mixed layer 109, as an impurity.

Next, a method for manufacturing the electrode according to one embodiment of the present invention will be described. That is to say, a method for manufacturing the electrode in FIG. 2 will be described. The electrode in FIG. 2 can be manufactured in such a manner that the active material layer 103 is formed over the current collector 101. The manufacturing method in the case where silicon is used as a material of the active material layer 103 will be described below.

The active material layer 103 is preferably formed by an LPCVD method. Here, the active material layer 103 is preferably formed at higher than or equal to 400° C. and lower than or equal to a temperature which an LPCVD apparatus and the current collector 101 can withstand and at which silicon of the active material layer 103 does not become amorphous, preferably higher than or equal to 500° C. and lower than 580° C., more preferably higher than or equal to 530° C. and lower than 580° C. Note that an LPCVD method is not necessarily employed, and a plasma CVD method or a thermal CVD method may be employed.

Further, as a deposition gas containing silicon which is used for the formation of the active material layer 103, a gas containing silicon hydride, silicon fluoride, silicon chloride, or the like can be used. Specifically, for example, $SiH_4$, $Si_2H_6$, $SiF_4$, $SiCl_4$, $Si_2Cl_6$, or the like can be used. Note that one or more of a hydrogen gas and rare gases such as helium, neon, argon, and xenon may be contained in the source gas.

Furthermore, in the formation of the active material layer 103, the pressure is set to be higher than or equal to 10 Pa and lower than or equal to 1000 Pa, preferably higher than or equal to 20 Pa and lower than or equal to 200 Pa. Note that the pressure falls within the range in which silicon of the active material layer 103 becomes amorphous.

With an LPCVD method, ions and electrons transfer easily at the interface between the current collector 101 and the active material layer 103 and the adhesion can be increased. In addition, throughput can be improved.

When a deposition gas of the active material layer 103 contains phosphine or diborane, the cores 105 of the plurality of whisker-like active material bodies can contain an impurity element imparting one conductivity type (e.g., phosphorus or boron). When the cores 105 contain an impurity element imparting one conductivity type, the conductivity of the whole electrode can be improved, resulting in increases in charge/discharge capacity of the power storage device.

Depending on the temperature, the mixed layer 109 is formed over the current collector 101 as illustrated in FIG. 1B. The mixed layer 109 is mainly formed of silicide. The silicide contains a metal element contained in the current collector 101 and silicon. As described above, the thickness of the mixed layer 109 is preferably 100 nm or less, more preferably 50 nm or less.

Although the case is described in which the current collector 101 is formed using a conductive material having a plate shape in this embodiment, a current collector may be used which is formed over a glass substrate or the like by a sputtering method, an evaporation method, a printing method, an inkjet method, a CVD method, or the like.

The use of the electrode described in this embodiment for a power storage device enables the power storage device to have excellent charge/discharge cycle characteristics.

With the method for manufacturing the electrode, which is described in this embodiment, a plurality of whisker-like active material bodies can be formed longer.

Example 1

In this example, a power storage device (secondary battery) according to one embodiment of the present invention will be described with reference to the drawings. In this example, the secondary battery which is a power storage device to which one embodiment of the present invention is applied (hereinafter referred to as an example battery) and a secondary battery for comparison (hereinafter referred to as a comparative battery) were manufactured and their battery characteristics were compared.

<Process for Forming Electrode of Example Battery>

First, a process for forming an electrode of the example battery will be described. At the beginning, the active material layer 103 was formed over the current collector 101.

As the current collector 101, a sheet of a titanium film (also called a titanium sheet) with a purity of 99.5%, a diameter of 12 mm, and a thickness of 100 µm was used. The current collector 101 was cleaned with 0.5% of hydrofluoric acid for ten minutes before the formation of the active material layer 103.

The active material layer 103 is formed of whisker-like silicon; the core 105 is formed of crystalline silicon, the outer shell 107 is formed of amorphous silicon, and part of the interface with the current collector 101 (titanium sheet) is formed of amorphous silicon.

Specifically, silicon as the active material layer 103 was formed over the titanium sheet of the current collector 101 by an LPCVD method. The active material layer 103 was formed for 60 minutes in a reaction chamber into which 300 sccm of silane gas ($SiH_4$ gas) and 300 sccm of nitrogen gas ($N_2$ gas) were introduced as source gases and in which the pressure was 150 Pa and the substrate temperature was 550° C. The reaction chamber was made of quartz. When the temperature of the current collector 101 was increased, a small amount of helium gas was introduced into the reaction chamber. Here, the film formation was performed by a hot wall method. A hot wall method refers to a method in which the temperature of a wall surface of a reaction chamber is set to be equal to or substantially equal to the substrate temperature and reaction is caused in thermal equilibrium.

As described above, the electrode of the example battery was formed.

<Structure of Electrode of Example Battery>

Figure 3A:
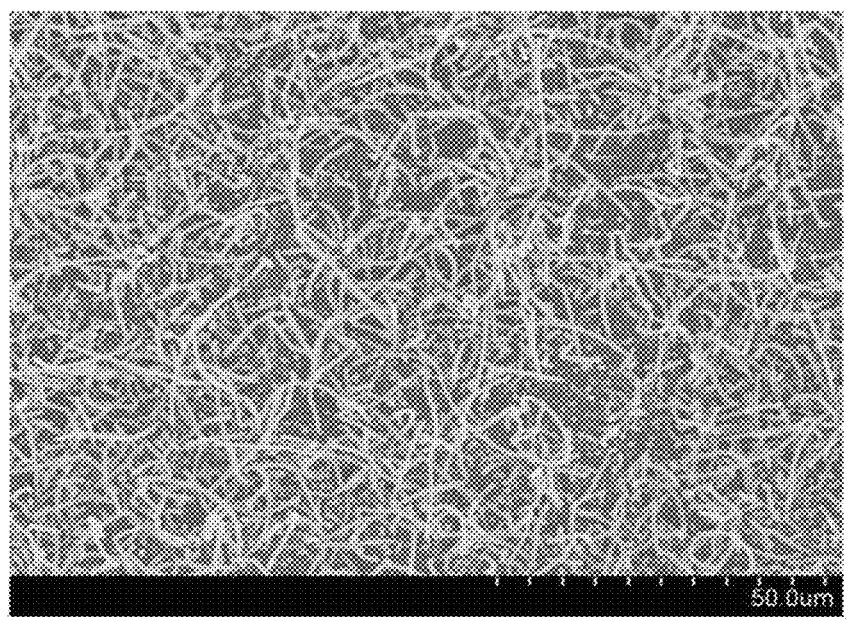
FIGS. 3A and 3B are SEM images of a surface of an electrode in an example.
Figure 3B:
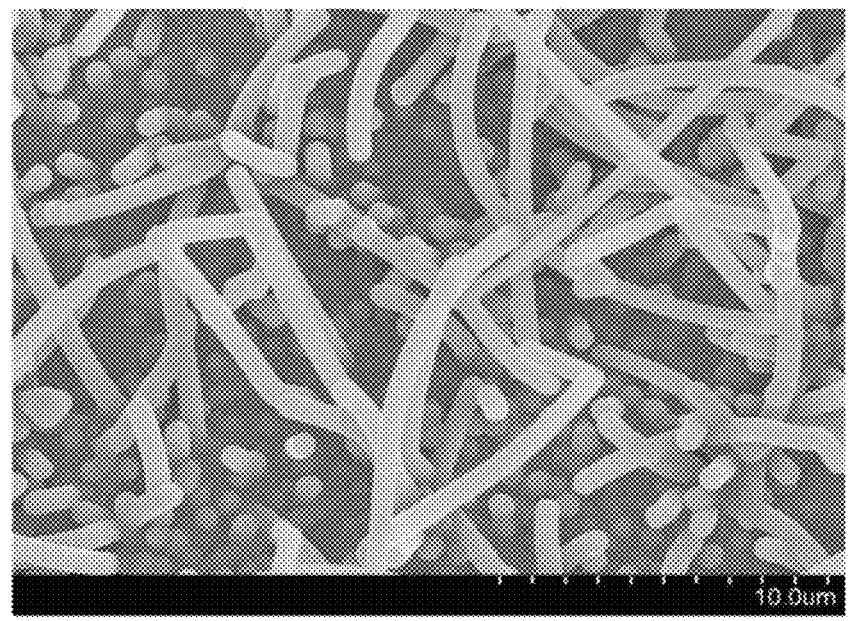

FIGS. 3A and 3B are plane scanning electron microscope (SEM) images of a surface of the electrode of the example battery, which was obtained through the above process. The magnifications of the images in FIGS. 3A and 3B are 1000 times and 5000 times, respectively.

As shown in FIGS. 3A and 3B, the surface of the electrode of the example battery is provided with a plurality of whisker-like active material bodies. Thus, the surface area of the active material layer is large. The length of a long whisker-like active material body of the active material bodies along the axis thereof was approximately 80 µm to 100 µm. The width of a cross section of the whisker-like active material body was 0.7 µm to 1.0 µm. The top portions of some of the whisker-like active material bodies are curved. The longitudinal directions of the whisker-like active material bodies are not the same.

Figure 4A:
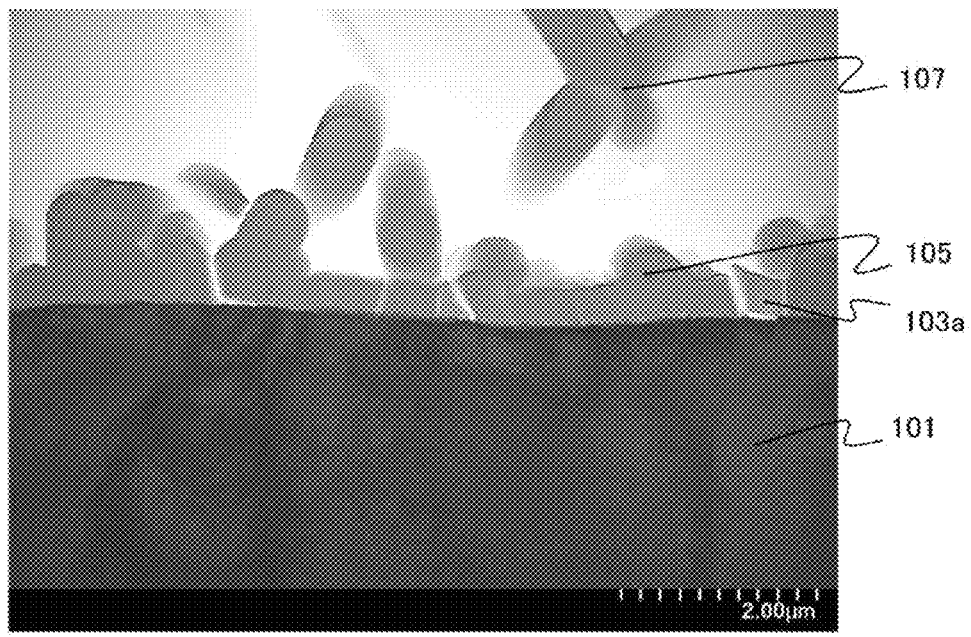
FIGS. 4A and 4B are STEM images of a surface of an electrode in an example.
Figure 4B:
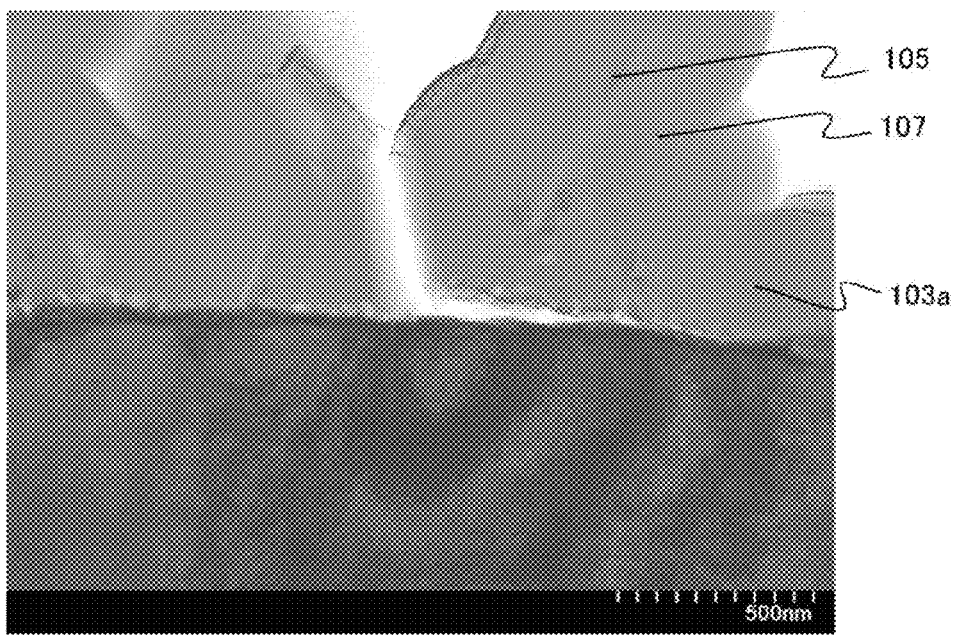
Figure 5:
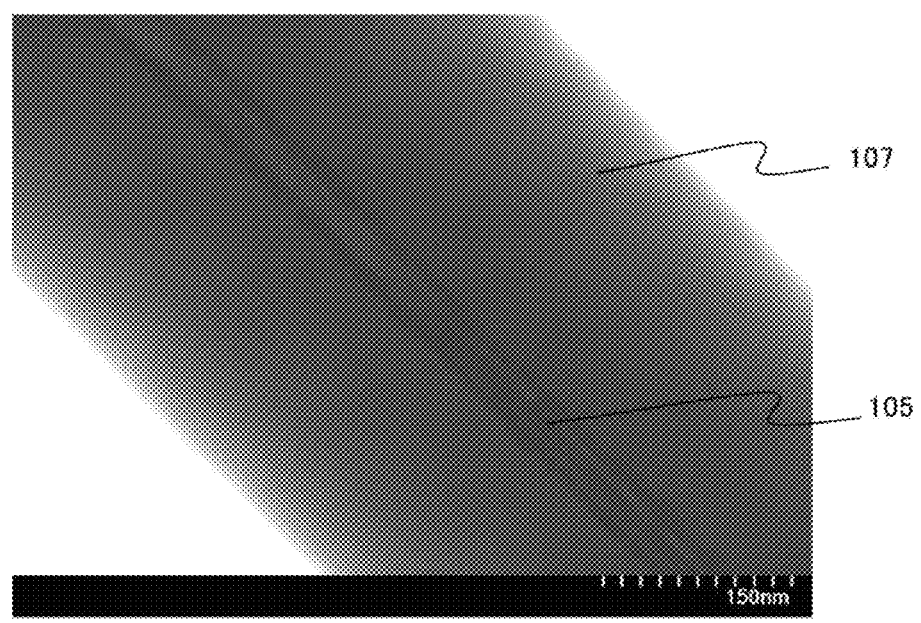
FIG. 5 is a STEM image of a surface of an electrode in an example.

FIGS. 4A and 4B and FIG. 5 are cross-sectional STEM images of given part of the surface of the electrode of the example battery, which was obtained through the above process. The magnifications of the images in FIGS. 4A and 4B and FIG. 5 are 15000 times, 60000 times, and 200000 times, respectively.

FIG. 4B is the magnified image of part of FIG. 4A. As shown in FIGS. 4A and 4B, a silicon layer is provided as an active material layer over the current collector 101. The silicon layer includes the region 103a and a region in which a whisker-like active material body provided on the region 103a exist. The region 103a is formed of amorphous silicon. The region in which the whisker-like active material body exists includes the core 105 formed of crystalline silicon and the outer shell 107 formed of amorphous silicon. It is possible to discriminate between amorphous silicon and crystalline silicon on the basis of a difference in contrast.

FIG. 5 is the magnified image of the region in which the whisker-like active material body exists. FIG. 5 shows that the region in which the whisker-like active material body exists includes the core 105 formed of crystalline silicon and the outer shell 107 formed of amorphous silicon.

Figure 15:
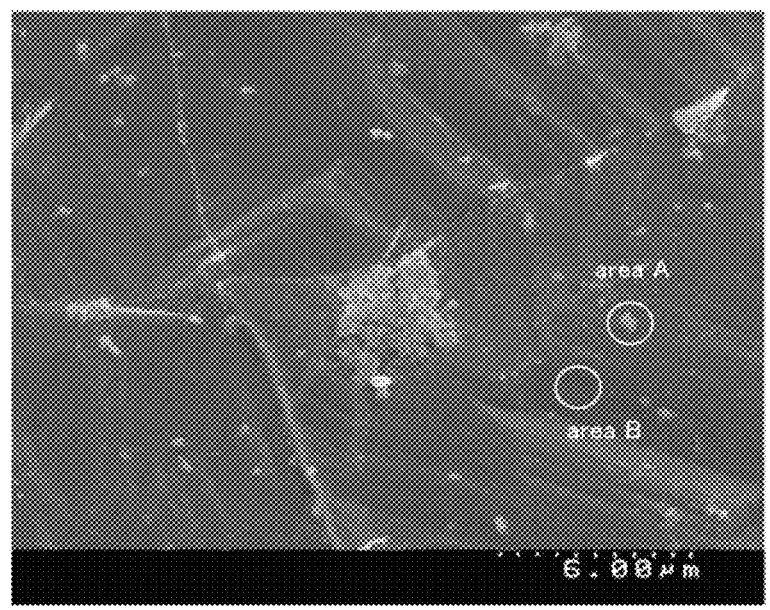
FIG. 15 is a SEM image showing a state at the initial stage of formation of whisker-like active material bodies.

FIG. 15 is a plane SEM image of such a whisker-like active material body formed for a minute under the above formation conditions in order to be observed in an initial stage of formation of the whisker-like active material body. The magnification of the image in FIG. 15 is 5000 times.

FIG. 15 shows that a lump (also called a stock) is formed on the current collector 101 (area A) and a filamentous object extends from the lump. The filamentous object is presumably the core 105 of the whisker-like active material body.

Figure 16:
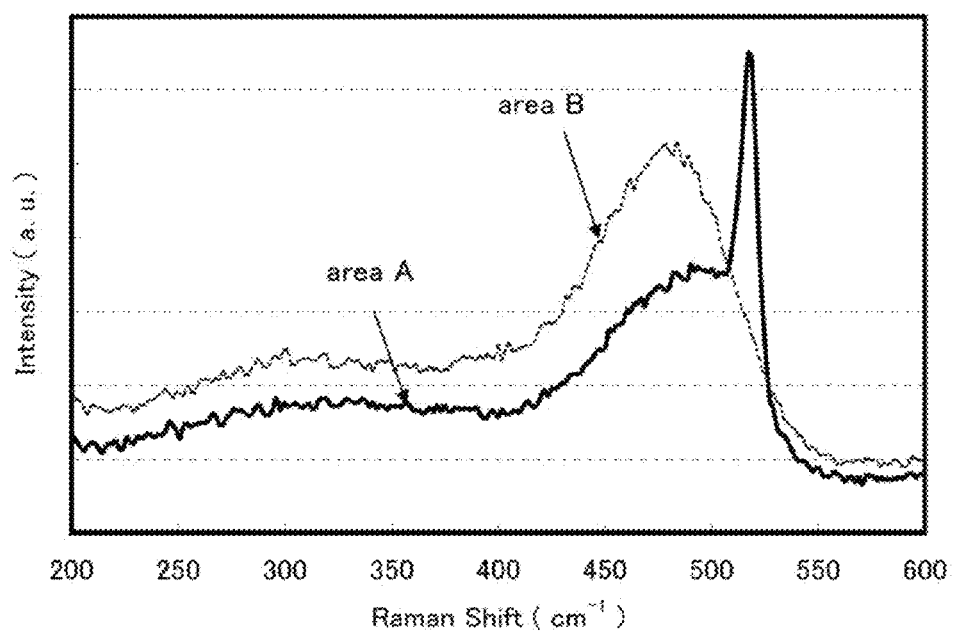
FIG. 16 is Raman spectra of FIG. 15.

FIG. 16 shows Raman spectra obtained in the area A and an area B in FIG. 15. FIG. 16 shows that the Raman spectrum obtained in the area B is broad, which indicates the area B has an amorphous structure, and the Raman spectrum obtained in the area A has a peak around 520 $cm^{-1}$, which indicates that the stock in the area A is crystalline silicon.

<Formation Process of Example Battery>

A formation process of the example battery of this example will be described with reference to FIG. 6.

Here, a coin-type secondary battery was formed as the example battery. A method for forming the coin-type secondary battery will be described below with reference to FIG. 6.

Figure 6:
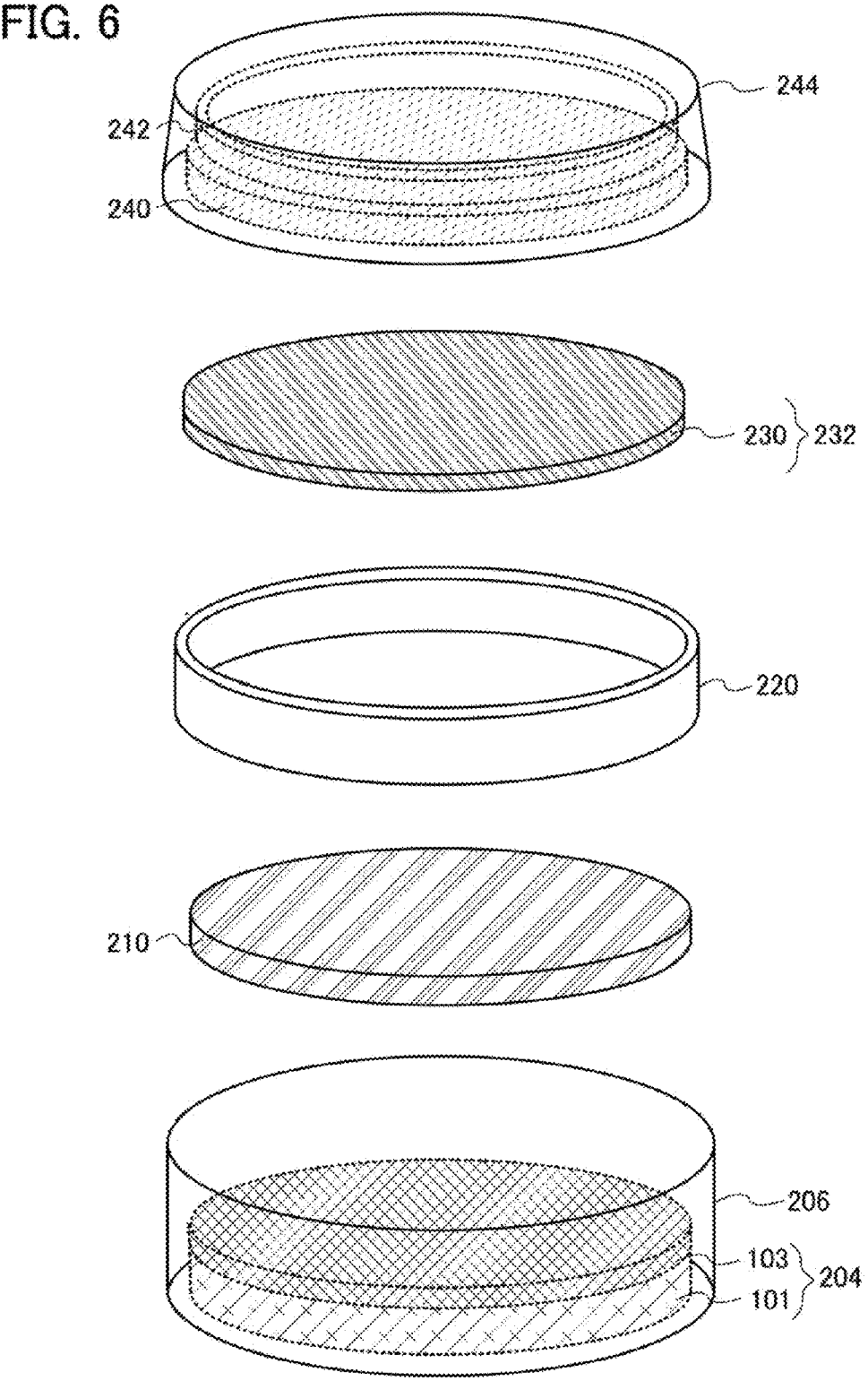
FIG. 6 is a perspective view illustrating a structure of a power storage device according to one embodiment of the present invention.

As illustrated in FIG. 6, the coin-type secondary battery includes an electrode 204, a reference electrode 232, a separator 210, an electrolyte (not illustrated), a housing 206, and a housing 244. Besides, the coin-type secondary battery includes a ring-shaped insulator 220, a spacer 240, and a washer 242. As the electrode 204, the electrode that is obtained through the process described above was used. The reference electrode 232 includes a reference electrode active material layer 230. The reference electrode active material layer 230 was formed using lithium foil. As the separator 210, polypropylene was used. The housing 206, the housing 244, the spacer 240, and the washer 242 each of which was made of stainless steel (SUS) were used. The housing 206 and the housing 244 electrically connect the electrode 204 and the reference electrode 232 to the outside.

In this example, a titanium sheet was used as the current collector 101, and the active material layer 103 was formed of the amorphous silicon or the crystalline silicon which are described above.

The electrode 204, the reference electrode 232, and the separator 210 were soaked in the electrolyte. Then, as illustrated in FIG. 6, the housing 206, the electrode 204, the separator 210, the ring-shaped insulator 220, the reference electrode 232, the spacer 240, the washer 242, and the housing 244 were stacked in this order such that the housing 206 was positioned at the bottom of the stacked components. The housing 206 and the housing 244 were crimped with a "coin cell crimper". In such a manner, the coin-type secondary battery was formed.

As the electrolyte, an electrolyte in which 1 M (morality) of $LiPF_6$ was dissolved in a mixed solvent of ethylene carbonate (EC) and diethyl carbonate (DEC) (mixing ratio: 1:1) was used.

<Formation Process of Electrode of Comparative Battery>

Next, a formation process of an electrode of the comparative battery will be described. The example battery and the comparative battery were different only in a step of forming an active material layer.

The active material layer of the comparative battery was formed of silicon; a core is formed of crystalline silicon, an outer shell was formed of amorphous silicon, and the interface with a titanium sheet was formed of crystalline silicon.

The active material layer of the comparative battery was formed for 70 minutes in a reaction chamber into which 700 sccm of silane gas ($SiH_4$ gas) was introduced as a source gas and in which the pressure was 100 Pa and the substrate temperature was 600° C. The reaction chamber was made of quartz. When the temperature of the current collector was increased, a small amount of helium gas was introduced into the reaction chamber. Here, the active material layer was formed in two steps under the above conditions. Specifically, after an active material layer was formed under the above conditions, the supply of the silane gas to the reaction chamber was stopped and the reaction chamber was evacuated (this period after the film formation is called an interval period), and then another active material layer was formed under the same conditions. Note that the film formation was performed by a hot wall method.

<Structure of Electrode of Comparative Battery>

Figure 7A:
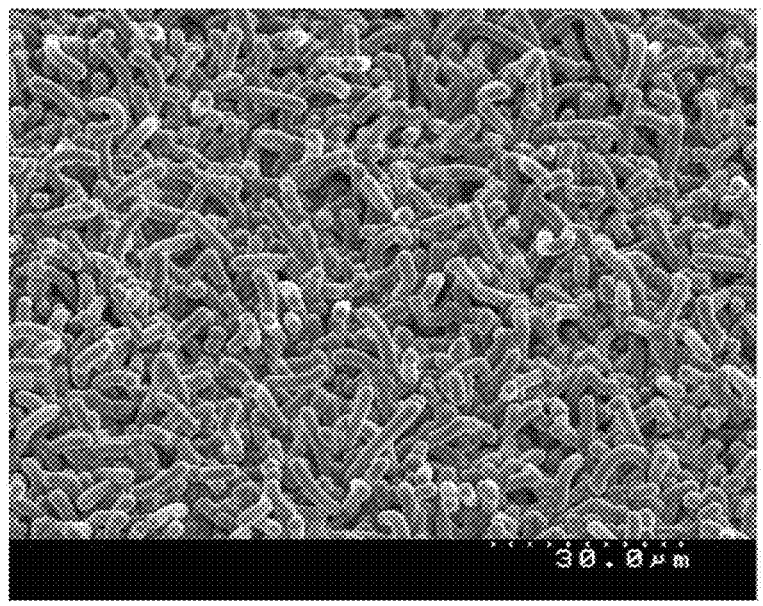
FIGS. 7A and 7B are SEM images of a surface of an electrode in a comparative example.
Figure 7B:
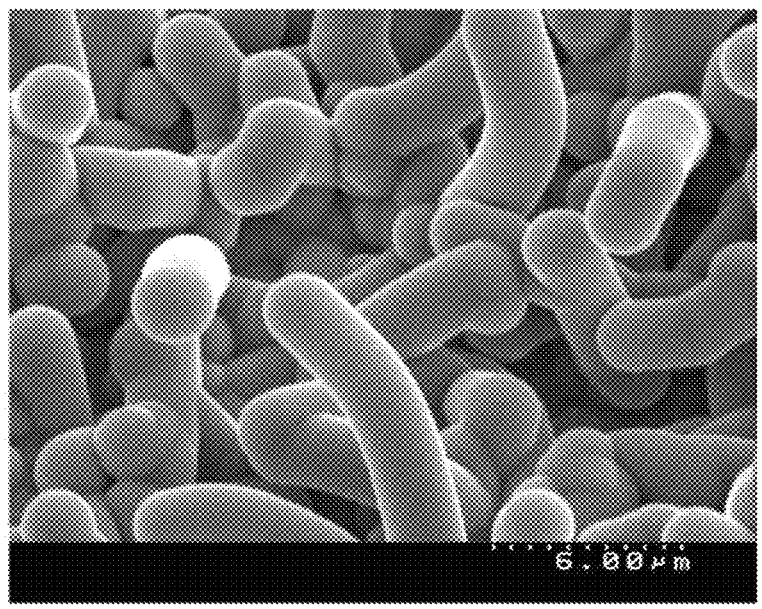

FIGS. 7A and 7B are plane SEM, images of a surface of the electrode of the comparative battery, which was obtained through the above process in the case where the interval period was five minutes. The magnifications of the images in FIGS. 7A and 7B are 1000 times and 5000 times, respectively. As shown in FIGS. 7A and 7B, the surface of the electrode of the comparative battery is also provided with a plurality of whisker-like active material bodies.

Figure 8A:
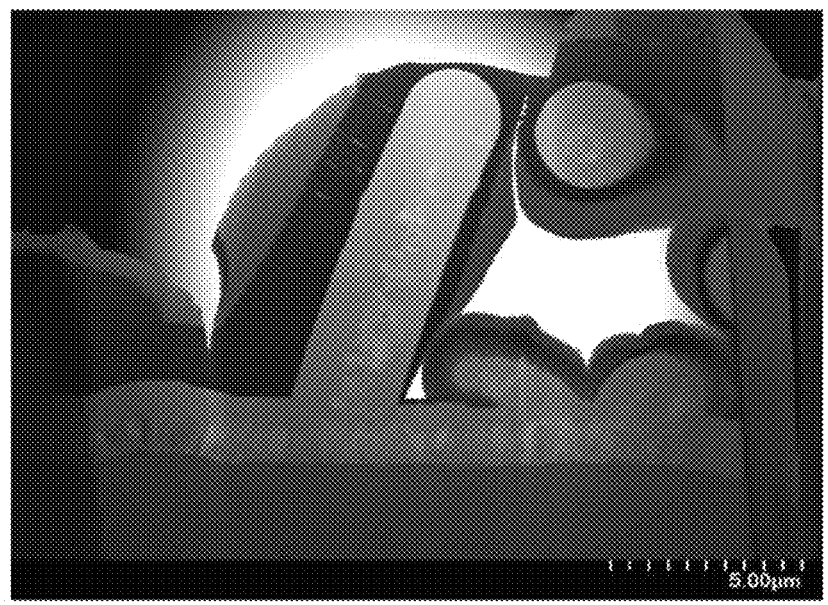
FIGS. 8A and 8B are STEM images of a surface of an electrode in a comparative example.
Figure 8B:
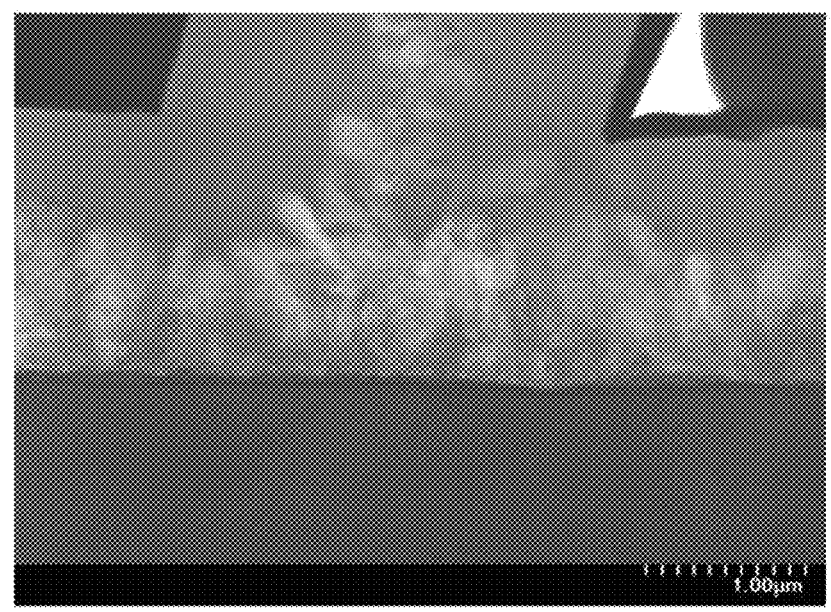

FIGS. 8A and 8B are cross-sectional STEM images of given part of the surface of the electrode of the comparative battery, which was obtained through the above process in the case where the interval period was five minutes. The magnifications of the images in FIGS. 8A and 8B are 6000 times and 25000 times, respectively.

FIG. 8B is the magnified image of part of FIG. 8A. As shown in FIGS. 8A and 8B, a silicon layer is provided as an active material layer over a current collector. Part of the silicon layer includes a whisker-like active material body and another part of the silicon layer which is in the vicinity of the current collector is formed of crystalline silicon.

The whisker-like active material body on the surface of the electrode of the comparative battery is coarser than the whisker-like active material body on the surface of the electrode of the example battery.

<Comparison between Observation Results of Example Battery and Comparative Battery>

Figure 9A:
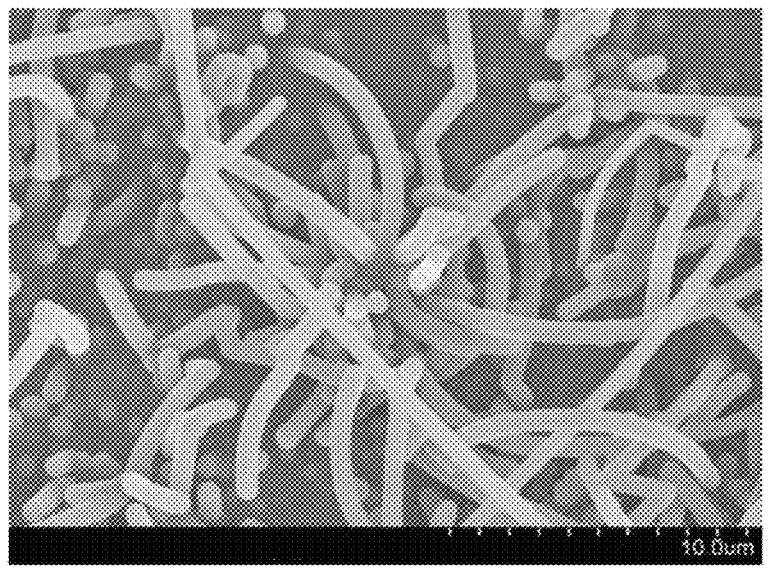
FIGS. 9A and 9B are SEM images of a surface of an electrode in an example and a surface of an electrode in a comparative example, respectively.
Figure 9B:
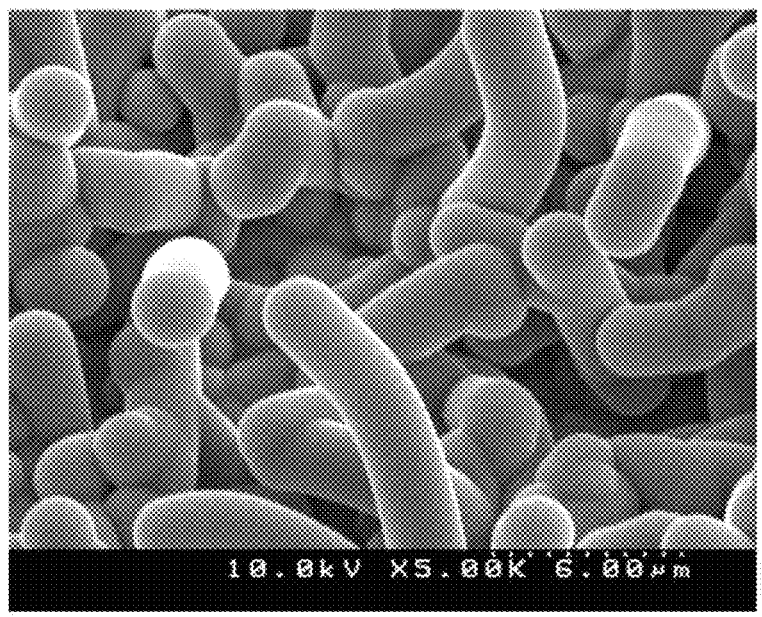

Here, the surface of the electrode of the example battery is compared with the surface of the electrode of the comparative battery in FIGS. 9A and 9B. FIG. 9A shows a SEM image of part of the surface of the electrode of the example battery which is different from part observed in FIGS. 3A and 3B. FIG. 9B shows a SEM image of part of the surface of the electrode of the comparative battery which is different from part observed in FIGS. 7A and 7B.

Comparison between FIGS. 9A and 9B reveals that the whisker-like active material body provided in the electrode of the example battery is thinner than the whisker-like active material body provided in the electrode of the comparative battery.

Figure 10A:
FIGS. 10A and 10B are STEM images of a surface of an electrode in an example and a surface of an electrode in a comparative example, respectively.
Figure 10B:
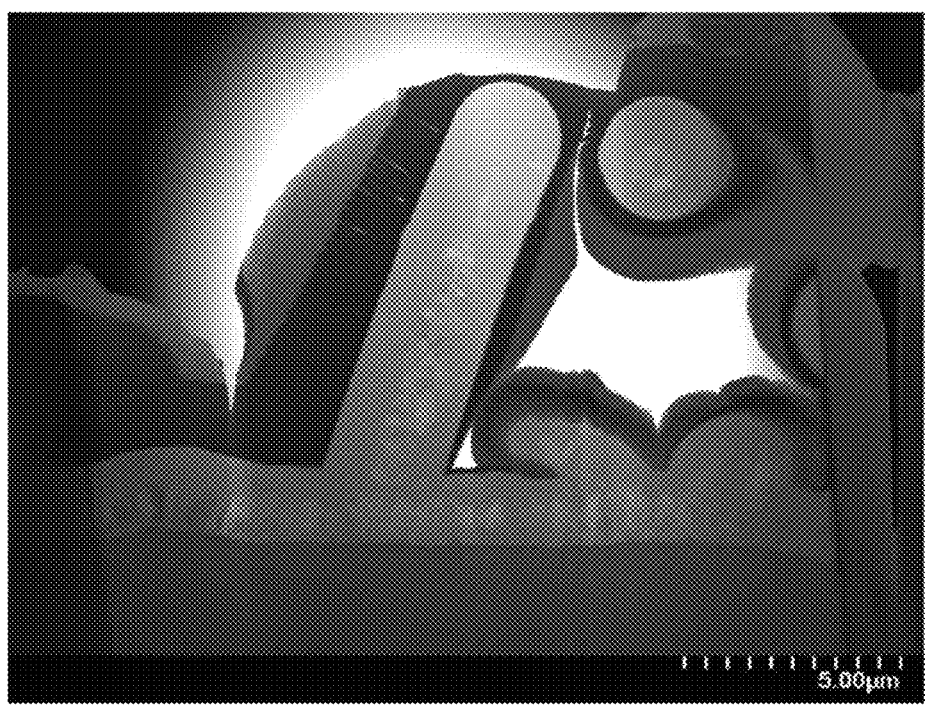

FIG. 10A shows a STEM image of part of the surface of the electrode of the example battery which is different from part observed in FIGS. 3A and 3B. FIG. 10B shows a STEM image of part of the surface of the electrode of the comparative battery which is different from part observed in FIGS. 7A and 7B.

FIG. 10A shows that most part of the whisker-like silicon on the surface of the electrode of the example battery was amorphous silicon and crystalline silicon was also contained in the rest part. In addition, extremely thin part of the silicon layer over the titanium sheet was observed.

As shown in FIG. 10B, a thick crystalline silicon layer was formed over the titanium sheet over the surface of the electrode of the comparative battery. In other words, the titanium sheet was covered with whisker-like silicon or crystalline silicon.

<Comparison between Characteristics of Example Battery and Comparative Battery>

The charge/discharge cycle characteristics of the example battery and the comparative battery which were formed through the above processes were examined.

The charge/discharge cycle characteristics were examined in such a manner that of the charge/discharge capacities of the example battery and the comparative battery were measured with a charge/discharge measuring instrument. The charge/discharge measurement was performed using a constant-current method under the conditions: the charge/discharge rate was about 0.1 C, the upper limit voltage was 1.0 V, and the lower limit voltage was 0.03 V. Note that all the samples were measured at room temperature.

Figure 11:
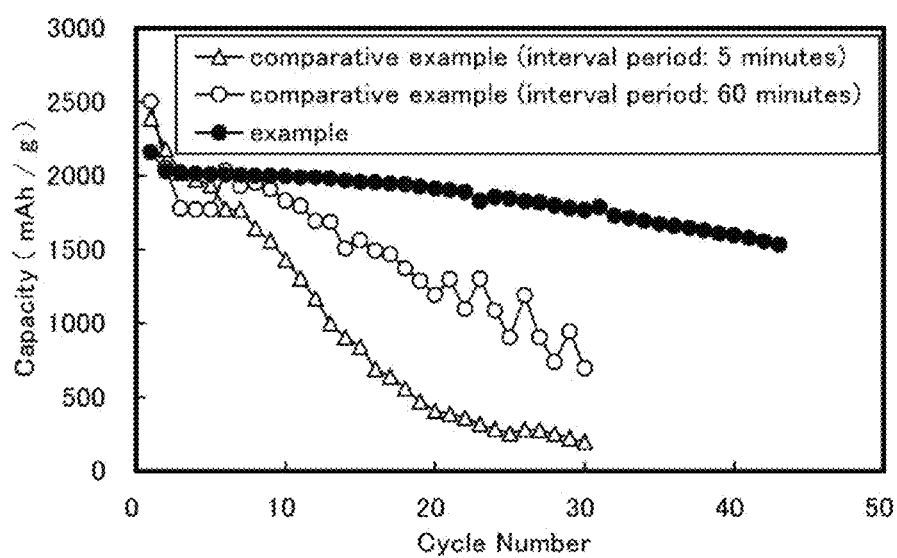
FIG. 11 is a graph showing comparison of charge/discharge cycle characteristics between a battery in an example and a battery in a comparative example.

FIG. 11 shows the charge/discharge cycle characteristics of the example battery and comparative batteries. When the example battery and two comparative batteries (one battery is formed in the case where the interval period in formation of an active material layer was five minutes, and the other is formed in the case where the interval period was 60 minutes) are compared, the charge/discharge cycle characteristics of the example battery is more favorable than the charge/discharge cycle characteristics of each of the comparative batteries. These results indicate that the degree of deterioration of the electrode of the example battery due to repeated charge/discharge cycles was low.

Further, in the case of the example battery, the charge/discharge capacity decreased moderately as the number of charging/discharging increased and even after charge/discharge cycles were repeated 40 times, at least 70% of the initial charge/discharge capacity was left. In contrast, in the case of the comparative/batteries, the deterioration was considerable; at the stage after charge/discharge cycles were repeated 30 times, only at most 10% of the initial charge/discharge capacity was left.

The main reason for the considerable deterioration of the comparative batteries is separation of active materials from current collectors due to repeated charge/discharge cycles. On the other hand, in the case of the example battery, separation of the active material from the current collector was not easily occur even when charge/discharge cycles were repeated.

Thus, the example battery to which one embodiment of the present invention is applied includes an electrode with durability for long-time use. This durability may possibly be owing to absence of a crystalline layer at the interface between the current collector and the active material, which allows high adhesion at the interface.

For that reason, according to one embodiment of the present invention, it is possible to manufacture a power storage device with less deterioration caused by repeated charge/discharge cycles.

<Examination and Comparison of Adhesion>

Figure 12A:
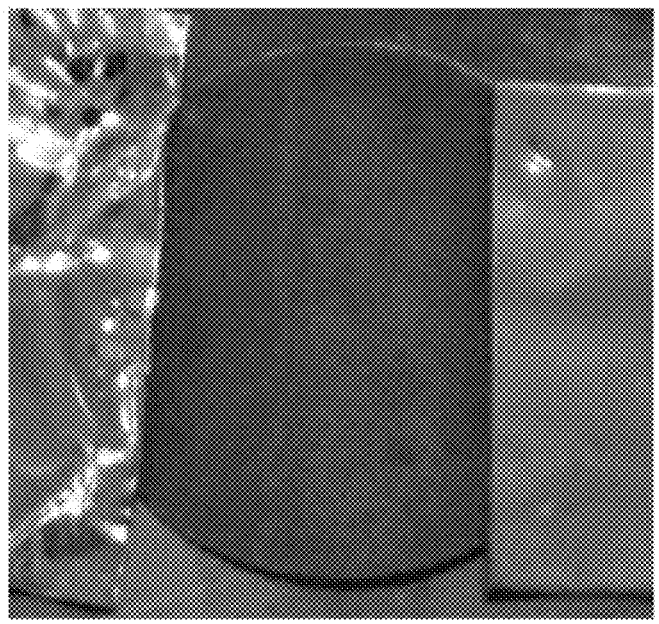
FIGS. 12A and 12B are photographs showing states of an electrode in an example and an electrode in a comparative example after adhesion tests.
Figure 12B:
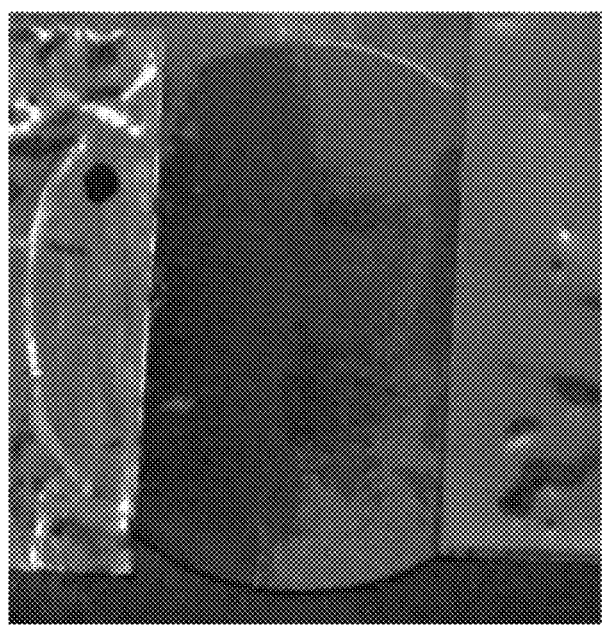

In order to compare the adhesion of the electrodes of the example battery and the comparative battery, which were formed through the above process, copper foil tapes were adhered to the electrodes and peeled. FIG. 12A is a photograph showing a sample surface after peeling of a copper foil tape adhered to the electrode of the example battery. FIG. 12B is a photograph showing a sample surface after peeling of a copper foil tape adhered to the electrode of the comparative battery. In FIG. 12A, the titanium sheet as the current collector is not exposed, whereas in FIG. 12B, the titanium sheet as the current collector is exposed.

Therefore, according to one embodiment of the present invention, it is possible to improve the adhesion between a current collector and an active material layer of an electrode and to manufacture, a power storage device with excellent charge/discharge cycle characteristics (highly reliable power storage device). Moreover, according to one embodiment of the present invention, the adhesion between a current collector and an active material layer is improved; thus, separation between the current collector and the active material layer in a manufacturing process can be prevented, resulting in an increase in yield.

Example 2

In this example, another secondary battery which is a power storage device will be described below. Lithium-ion batteries formed using lithium-containing metal oxides, one example of secondary batteries, have high charge/discharge capacities and can be used at room temperature, so that such lithium-ion batteries are used in many electronic devices. Here, the structure of a lithium-ion battery as a secondary battery will be described with reference to FIGS. 13A and 13B.

Figure 13A:
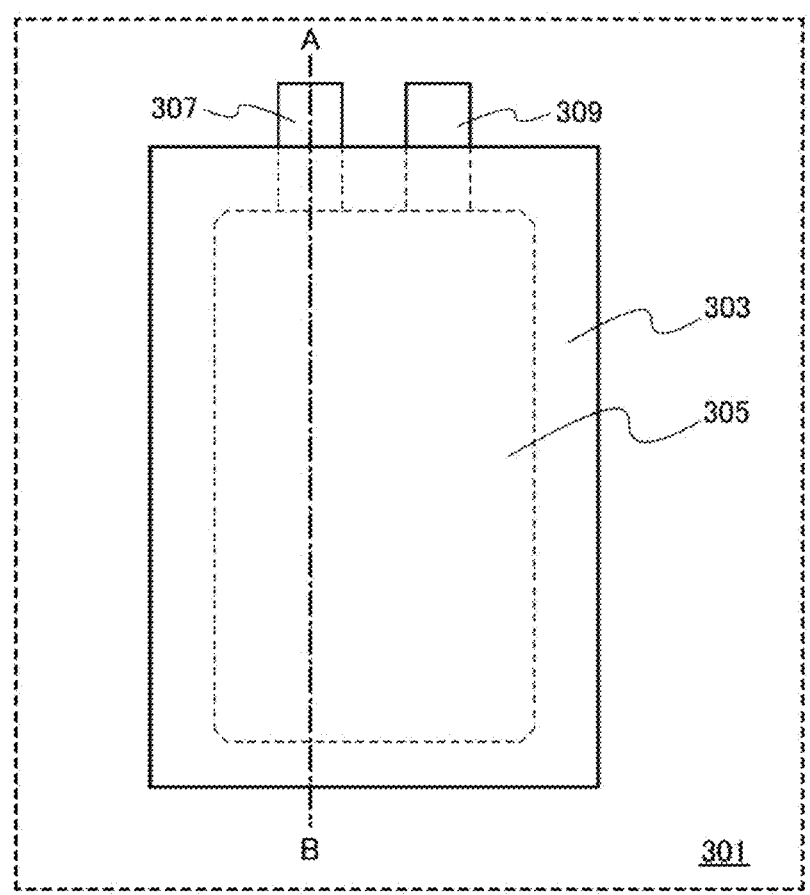
FIGS. 13A and 13B illustrate an example of a power storage device according to one embodiment of the present invention.
Figure 13B:
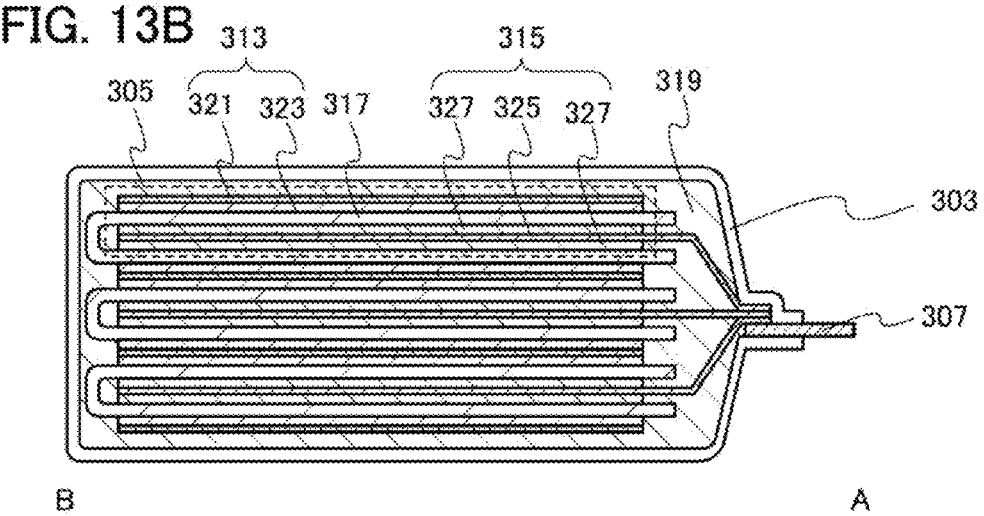

FIG. 13A is a plan view of a power storage device 301, and FIG. 13B is a cross-sectional view along dashed dotted line A-B in FIG. 13A. The power storage device 301 illustrated in FIG. 13A includes a power storage cell 305 in an exterior member 303. The power storage device 301 further includes a terminal portion 307 and a terminal portion 309 which are connected to the power storage cell 305. For the exterior member 303, a laminate film, a polymer film, a metal film, a metal case, a plastic case, or the like can be used.

As illustrated in FIG. 13B, the power storage cell 305 includes a negative electrode 313, a positive electrode 315, a separator 317, and an electrolyte 319. The separator 317 is provided between the negative electrode 313 and the positive electrode 315. A portion almost surrounded with the exterior member 303 is filled with the electrolyte 319, and the power storage cell 305 and the separator 317 are soaked with the electrolyte 319.

The negative electrode 313 includes a negative electrode current collector 321 and a negative electrode active material layer 323. The positive electrode 315 includes a positive electrode current collector 325 and a positive electrode active material layer 327. The negative electrode active material layer 323 is formed on one of or both the surfaces of the negative electrode current collector 321. The positive electrode active material layer 327 is formed on one of or both the surfaces of the positive electrode current collector 325.

The negative electrode current collector 321 is connected to the terminal portion 309. The positive electrode current collector 325 is connected to the terminal portion 307. Further, the terminal portions 307 and 309 each partly extend outside the exterior member 303.

Note that although a sealed thin power storage device is described as the power storage device 301 in this embodiment, the external shape of the power storage device 301 is not limited thereto and can be any of a variety of shapes such as a button shape, a cylindrical shape, or a rectangular shape. Further, although the structure where the positive electrode, the negative electrode, and the separator are stacked is described in this example, a structure where the positive electrode, the negative electrode, and the separator are rolled may be employed.

As the negative electrode current collector 321, the current collector 101 illustrated in FIG. 2 can be used. Alternatively, the substrate 115 over which the metal layer 111 is formed, which is illustrated in FIG. 1C, may be used.

As the negative electrode active material layer 323, the active material layer 103 formed using an amorphous silicon layer, which is illustrated in FIG. 2, can be used. In addition, when the active material layer 103 is formed using amorphous silicon, with the negative electrode current collector 321 held by a frame-like susceptor in an LPCVD apparatus, the active material layer 103 can be formed on both the surfaces of the negative electrode current collector 321 at the same time. Accordingly, the number of manufacturing steps can be reduced in the case where both the surfaces of the negative electrode current collector 321 are used for formation of the electrode.

As a material of the positive electrode current collector 325, aluminum, stainless steel, or the like is used. The shape of the positive electrode current collector 325 can be a foil shape, a plate shape, a net shape, or the like.

The positive electrode active material layer 327 can be formed using any of $LiFeO_2$, $LiCoO_2$, $LiNiO_2$, $LiMn_2O_4$, $LiFePO_4$, $LiCoPO_4$, $LiNiPO_4$, $LiMn_2PO_4$, $V_2O_5$, $Cr_2O_5$, $MnO_2$, and other lithium compounds as a material. Note that when carrier ions are alkali metal ions other than lithium ions, alkaline earth metal ions, beryllium ions, or magnesium ions, the positive electrode active material layer 327 can be formed using, instead of lithium in the above lithium compounds, an alkali metal (e.g., sodium or potassium), an alkaline earth metal (e.g., calcium, strontium, or barium), beryllium, or magnesium.

As a solute of the electrolyte 319, a material in which lithium ions that are carrier ions can transfer and stably exist is used. Examples of the solute of the electrolyte 319 include lithium salts such as $LiClO_4$, $LiAsF_6$, $LiBF_4$, $LiPF_6$, and $Li(C_2F_5SO_2)_2N$. Note that when carrier ions are alkali metal ions other than lithium ions or alkaline earth metal ions, alkali metal salt (e.g., sodium salt or potassium salt), alkaline earth metal salt (e.g., calcium salt, strontium salt or barium salt), beryllium salt, magnesium salt, or the like can be used as the solute of the electrolyte 319.

As the solvent of the electrolyte 319, a material in which lithium ions can transfer is used. As the solvent of the electrolyte 319, an aprotic organic solvent is preferably used. Examples of the aprotic organic solvent include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled high-molecular material is used as the solvent of the electrolyte 319, safety against liquid leakage and the like is improved and the power storage device 301 can be thinner and more lightweight. Examples of the gelled high-molecular material include a silicon gel, an acrylic gel, an acrylonitrile gel, polyethylene oxide, polypropylene oxide, and a fluorine-based polymer.

As the electrolyte 319, a solid electrolyte such as $Li_3PO_4$ can be used.

As the separator 317, an insulating porous material is used. Examples of the separator 317 include cellulose (paper), polyethylene, and polypropylene.

A lithium ion battery has a small memory effect, a high energy density, and a high charge/discharge capacity. In addition, the output voltage of the lithium ion battery is high. Thus, it is possible to reduce the size and weight of the lithium ion battery. Further, the lithium ion battery does not easily deteriorate due to repeated charge/discharge cycles and can be used for a long time, leading to a reduction in cost.

The power storage device in this example may be a capacitor. As the capacitor, an electric double layer capacitor, a lithium ion capacitor, and the like can be given. The lithium ion capacitor has high charge/discharge efficiency which allows rapid charge/discharge, and has a long life even when it is repeatedly used.

In the case of a capacitor, instead of the positive electrode active material layer 327 in the secondary battery in FIG. 13B, a material capable of reversibly occluding and releasing one of or both lithium ions and anions may be used. The positive electrode active material layer 327 can be formed using active carbon, a conductive high molecule, a polyacene organic semiconductor (PAS), or the like.

The use of the electrode described in Embodiment 1 as the negative electrode 313 permits formation of a power storage device having a high charge/discharge capacity.

Note that the use of the electrode described in Embodiment 1 as a negative electrode of an air cell which is a power storage device leads to an increase in charge/discharge capacity of the air cell.

In the electrode of a power storage device, according to one embodiment of the present invention, the adhesion between the current collector and the active material layer is high; accordingly, the active material layer 103 is not easily separated from the current collector 101 (or the metal layer 111) even when the negative electrode current collector 321 is bent. Thus, the electrode can be curved with a small radius of curvature or can be bent as long as it is not deformed, and a flexible power storage device can be formed.

Example 3

The power storage device according to one embodiment of the present invention can be used for power sources of a variety of products which can be operated with power. In this example, the following application examples will be described.

Specific examples of products each utilizing the power storage device according to one embodiment of the present invention (these products are hereinafter referred to as application examples and include electronic and electric appliances) are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and dialyzers. In addition, moving objects driven by electric motors using power from power storage devices are also examples of such products. Examples of the moving objects include electric vehicles, hybrid vehicles each including both an internal-combustion engine and an electric motor, and motorized bicycles including motor-assisted bicycles.

In the application example described in this example, the power storage device according to one embodiment of the present invention can be used as a power storage device for supplying enough power for almost, the whole power consumption (such a power storage device is referred to as a main power source). Alternatively, in the application example, the power storage device according to one embodiment of the present invention can be used as a power storage device of an emergency power source which can supply power to an electric device when the supply of power from the main power source is stopped. Still alternatively, in the electric device, the power storage device according to one embodiment of the present invention can be used as a power storage device for supplying power to the electric device at the same time as the power supply from the main power source or a commercial power source (such a power storage device is referred to as an auxiliary power source).

Figure 14:
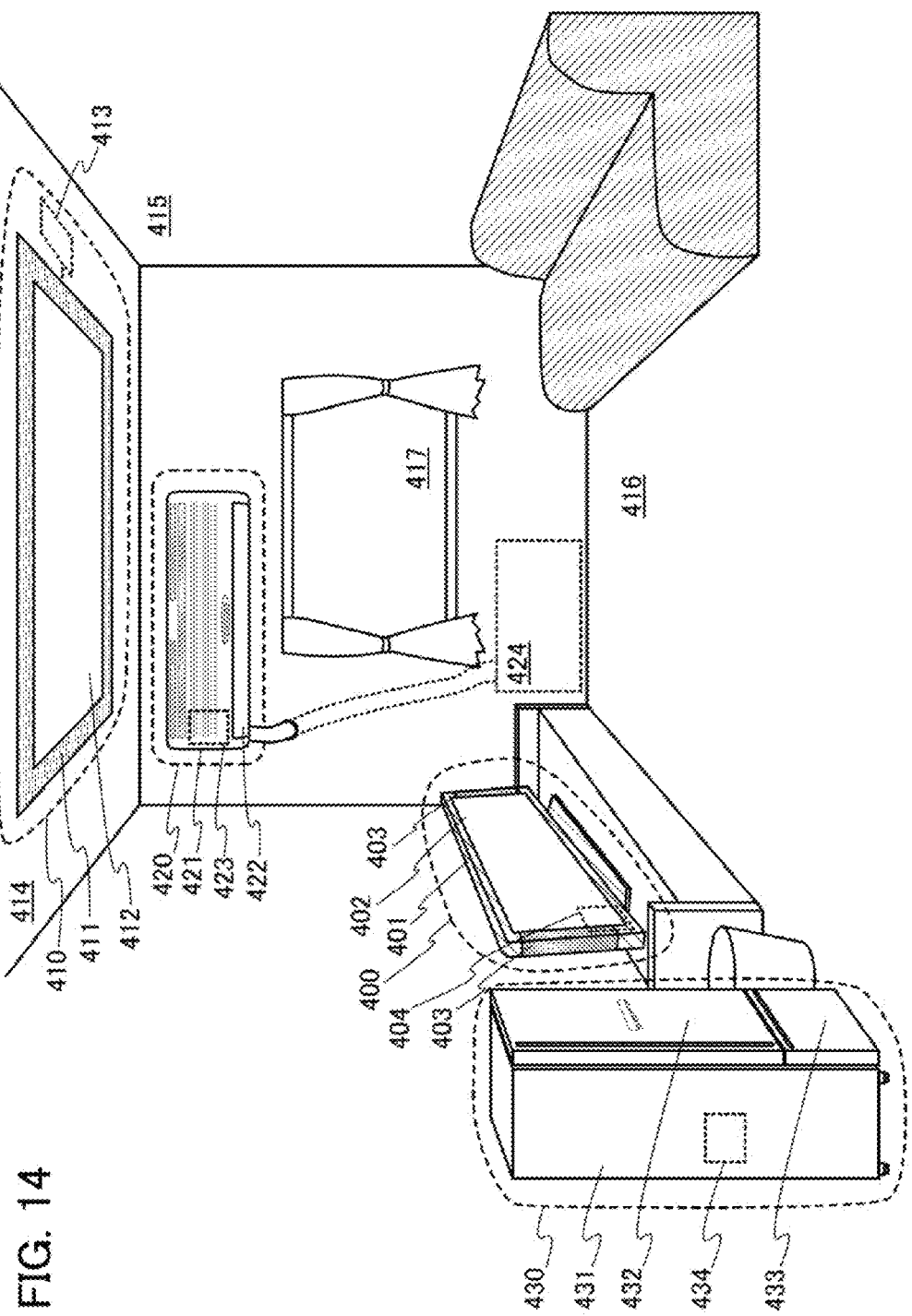
FIG. 14 illustrates application examples of a power storage device according to one embodiment of the present invention.

FIG. 14 illustrates a room furnished with a variety of application examples. In FIG. 14, a display device 400 is an application example. The display device 400 which corresponds to a television set, includes a housing 401, a display portion 402, speaker portions 403, a power storage device 404, and the like. The power storage device 404 is provided in the housing 401. The display device 400 can use either power supplied externally or power stored in the power storage device 404. Thus, the display device 400 can be operated with the use of the power storage device according to one embodiment of the invention as the power storage device 404 even when external supply of power is stopped due to a power failure or the like.

As the display portion 402, a semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), or the like can be used.

A display device on which the power storage device according to one embodiment of the present invention can be mounted is not limited to the television set and can also be applied to a monitor of a personal computer, an advertisement display board, and the like.

In FIG. 14, a lighting device 410 is another application example. The lighting device 410 includes a housing 411, a light source 412, a power storage device 413, and the like. FIG. 14 illustrates the case where the housing 411, the light source 412, and the power storage device 413 are embedded in a ceiling 414. The power storage device 413 may be provided in the housing 411. The lighting device 410 can use either power supplied externally or power stored in the power storage device 413. Thus, the lighting device 410 can be operated with the use of the power storage device according to one embodiment of the invention as the power storage device 413 even when external supply of power is stopped due to a power failure or the like.

Although the lighting device 410 embedded in the ceiling 414 is illustrated in FIG. 14, a lighting device using the power storage device according to one embodiment of the present invention can be installed on a wall 415, a floor 416, a window 417, or the like. Alternatively, the power storage device can be used for a tabletop lighting device and the like.

As the light source 412, an artificial light source can be used. Specific examples of the artificial light source include discharge lamps such as an incandescent lamp and a fluorescent lamp, and light-emitting elements such as an LED and an organic EL element.

In FIG. 14, an air conditioner is another application example. The air conditioner in FIG. 14 includes an indoor unit 420 and an outdoor unit 424. The indoor unit 420 includes a housing 421, an air outlet 422, a power storage device 423, and the like. Although FIG. 14 illustrates the case where the power storage device 423 is provided in the indoor unit 420, one embodiment of the present invention is not limited thereto; alternatively, the power storage device 423 may be provided in the outdoor unit 424. Still alternatively, the power storage device 423 may be provided in each of the indoor unit 420 and the outdoor unit 424. The air conditioner in FIG. 14 can use either power supplied externally or power stored in the power storage device 423. Particularly in the case where the power storage device 423 is provided in each of the indoor unit 420 and the outdoor unit 424, the air conditioner can be operated with the use of the power storage device according to one embodiment of the invention as the power storage device 423 even when external supply of power is stopped due to a power failure or the like.

Note that although the split-type air conditioner including the indoor unit and the outdoor unit is illustrated in FIG. 14, the power storage device according to one embodiment of the invention can be used in an air conditioner in which the functions of an indoor unit and an outdoor unit are integrated in one housing.

In FIG. 14, an electric refrigerator-freezer 430 is another application example. The electric refrigerator-freezer 430 in FIG. 14 includes a housing 431, a door for a refrigerator 432, a door for a freezer 433, the power storage device 434, and the like. The power storage device 434 is provided in the housing 431. The electric refrigerator-freezer 430 can use either power supplied externally or power stored in the power storage device 434. Thus, the electric refrigerator-freezer 430 can be operated with the use of the power storage device according to one embodiment of the invention as the power storage device 434 even when external supply of power is stopped due to a power failure or the like.

Appliances such as a microwave oven and an electric rice cooker require high power in a short time. Thus, in such an appliance, the power storage device according to one embodiment of the invention can be used as an auxiliary power source for supplying power when power cannot be externally supplied sufficiently.

In addition, power is stored in the power storage devices in a time period when the electric appliances are not often used (in a time period when the usage rate of power is low, mainly in night time), whereby a rise in usage rate of power in a time period when the electric appliances are used frequently can be suppressed.

For example, in the case of the electric refrigerator-freezer 430, power is stored in the power storage device 434 in night time when the temperature is low and the door for a refrigerator 432 and the door for a freezer 433 are not often opened or closed. On the other hand, in daytime when the temperature is high and the door for a refrigerator 432 and the door for a freezer 433 are frequently opened and closed, the power storage device 434 is used as an auxiliary power source; thus, the usage rate of power in daytime when the usage rate of power is supposed to be high can be reduced.

This application is based on Japanese Patent Application serial no. 2011-140253 filed with the Japan Patent Office on Jun. 24, 2011 and Japanese Patent Application serial no. 2011-140429 filed with the Japan Patent Office on Jun. 24, 2011, the entire contents of which are hereby incorporated by reference.

What is claimed is:

1. An electrode of a power storage device, comprising:
    a current collector; and
    an active material layer including a first region and a second region over the current collector,
    wherein the first region covers an entire surface of the current collector,
    wherein the second region includes a plurality of whisker-like active material bodies, the plurality of whisker-like active material bodies being amorphous and extended from the first region,
    wherein at least one of the plurality of whisker-like active material bodies includes at least a core and an outer shell covering the core,
    wherein the outer shell is amorphous,
    wherein the core is in contact with the current collector through the first region, and
    wherein an interface between the first region and the second region is a surface which is parallel to the surface of the current collector and overlaps with a bottom of a deepest valley of valleys between the plurality of whisker-like active material bodies.

2. The electrode of a power storage device, according to claim 1,
    wherein a material of the active material layer is silicon.

3. The electrode of a power storage device, according to claim 1, wherein the current collector is a metal layer over a substrate.

4. The electrode of a power storage device, according to claim 1, wherein a material of the current collector is titanium.

5. The electrode of a power storage device, according to claim 1, wherein each of the plurality of whisker-like active material bodies partly includes crystalline silicon.

6. The electrode of a power storage device, according to claim 1, wherein 90% or more in volume of each of the plurality of whisker-like active material bodies is amorphous.

7. A power storage device comprising the electrode, according to claim 1.

8. An electrode of a power storage device, comprising:
a current collector; and
an active material layer including a first region and a second region over the current collector,
wherein the first region covers an entire surface of the current collector,
wherein the second region includes a plurality of whisker-like active material bodies, the plurality of whisker-like active material bodies being extended from the first region,
wherein each of the plurality of whisker-like active material bodies includes at least a core and an outer shell covering the core,
wherein the outer shell is amorphous,
wherein a portion of the first region is amorphous,
wherein the core is in contact with the current collector through the first region, and
wherein an interface between the first region and the second region is a surface which is parallel to the surface of the current collector and overlaps with a bottom of a deepest valley of valleys between the plurality of whisker-like active material bodies.

9. The electrode of a power storage device, according to claim 8, wherein a width of a cross section of the core of each of the plurality of whisker-like active material bodies is greater than or equal to 50 nm and less than or equal to 10000 nm.

10. The electrode of a power storage device, according to claim 8, wherein a material of the active material layer is silicon.

11. The electrode of a power storage device, according to claim 8, wherein the current collector is a metal layer over a substrate.

12. The electrode of a power storage device, according to claim 8, wherein a material of the current collector is titanium.

13. The electrode of a power storage device, according to claim 8, wherein the core of each of the plurality of whisker-like active material bodies is crystalline silicon.

14. The electrode of a power storage device, according to claim 8, wherein 90% or more in volume of each of the plurality of whisker-like active material bodies is amorphous.

15. A power storage device comprising the electrode, according to claim 8.

16. An electrode of a power storage device, comprising:
a current collector;
an active material layer including a first region and a second region over the current collector, the active material layer including silicon; and
a silicide layer of the current collector being between the current collector and the first region,
wherein the silicide layer covers an entire surface of the current collector,
wherein the first region covers an entire surface of the silicide layer,
wherein the second region includes a plurality of whisker-like active material bodies, the plurality of whisker-like active material bodies being amorphous and extended from the first region,
wherein a thickness of the silicide layer is 50 nm or less,
wherein at least one of the plurality of whisker-like active material bodies includes at least a core and an outer shell covering the core,
wherein the outer shell is amorphous,
wherein the core is in contact with the current collector through the first region, and
wherein an interface between the first region and the second region is a surface which is parallel to the surface of the current collector and overlaps with a bottom of a deepest valley of valleys between the plurality of whisker-like active material bodies.

17. The electrode of a power storage device, according to claim 16, wherein the current collector is a metal layer over a substrate.

18. The electrode of a power storage device, according to claim 16, wherein a material of the current collector is titanium.

19. The electrode of a power storage device, according to claim 16, wherein each of the plurality of whisker-like active material bodies partly includes crystalline silicon.

20. The electrode of a power storage device, according to claim 16, wherein 90% or more in volume of each of the plurality of whisker-like active material bodies is amorphous.

21. A power storage device comprising the electrode, according to claim 16.

* * * * *